(12) United States Patent
Hamlin

(10) Patent No.: US 6,940,870 B2
(45) Date of Patent: *Sep. 6, 2005

(54) SYSTEM AND METHOD FOR COMMUNICATING DATA

(75) Inventor: James K. Hamlin, Kernersville, NC (US)

(73) Assignee: Falk Integrated Technologies, Inc., Greensboro, NC (US)

( * ) Notice: Subject to any disclaimer, the term of this patent is extended or adjusted under 35 U.S.C. 154(b) by 547 days.

This patent is subject to a terminal disclaimer.

(21) Appl. No.: 09/906,222

(22) Filed: Jul. 16, 2001

(65) Prior Publication Data

US 2001/0040897 A1 Nov. 15, 2001

Related U.S. Application Data

(63) Continuation of application No. 09/000,751, filed on Dec. 30, 1997.

(51) Int. Cl.[7] .................................................. H04J 3/16
(52) U.S. Cl. ..................... 370/466; 370/467; 709/223
(58) Field of Search ................................ 370/466, 338, 370/397, 408, 410, 465, 467; 709/223, 230, 201; 714/800

(56) References Cited

U.S. PATENT DOCUMENTS

| | | | |
|---|---|---|---|
| 4,598,404 A | 7/1986 | Perry et al. ................... 371/49 |
| 4,642,758 A | 2/1987 | Teng .......................... 364/200 |
| 4,714,995 A | 12/1987 | Materna et al. ............. 364/200 |
| 4,751,740 A | 6/1988 | Wright .......................... 382/1 |
| 4,905,138 A | 2/1990 | Bourne ....................... 364/200 |
| 5,133,053 A | 7/1992 | Johnson et al. ............. 395/200 |
| 5,187,787 A | 2/1993 | Skeen et al. ................ 395/600 |
| 5,202,977 A | 4/1993 | Pasetes, Jr. et al. ......... 395/500 |
| 5,257,369 A | 10/1993 | Skeen et al. ................ 395/650 |

(Continued)

FOREIGN PATENT DOCUMENTS

| | | |
|---|---|---|
| EP | 413074 B1 | 2/1991 |
| JP | 08-235112 | 9/1996 |
| JP | 09-282287 | 10/1997 |
| WO | WO97/37500 | 10/1997 |

OTHER PUBLICATIONS

IBM Corporation, "MQSeries Version 5—The Next Generation," (visited on Apr. 20, 1998) <http://www.software.ibm.com/ts/mqseries/library/whitepapers/mq5/>.

(Continued)

*Primary Examiner*—Chi Pham
*Assistant Examiner*—Alexander O. Boakye
(74) *Attorney, Agent, or Firm*—Fish & Neave IP Group of Ropes & Gray LLP; Jeffrey H. Ingerman; Jeffrey D. Mullen

(57) ABSTRACT

The present invention provides a system and method for communicating data between a source application process and one or more destination application processes. This system and method perform conversion and routing functions which require only a single conversion of all outbound transmissions regardless of the variety of destinations, and only a single conversion of all inbound transmissions regardless of the variety of sources. The functions also enable changes, additions, and deletions of sources and destinations of transmissions to be made without modification of a source or destination application process and without taking a source or destination application process off-line. The functions further enable this system and method to be implemented in virtually any enterprise architecture without requiring that each processing system of the architecture be custom built. These conversion and routing functions are performed by first receiving data to be transmitted in a source format from a source application. This data are then converted from the source format to a standard format. Next, one or more destinations are identified in a database using a transaction type corresponding to the data and/or the address of the source application. After identifying the one or more destinations, a copy of the data is transmitted to each and the data are then converted from the standard format to a destination format. Lastly, this converted data are passed to the destination process.

290 Claims, 9 Drawing Sheets

U.S. PATENT DOCUMENTS

| | | | |
|---|---|---|---|
| 5,276,869 A | 1/1994 | Forrest et al. | 395/600 |
| 5,339,434 A | 8/1994 | Rusis | 395/700 |
| 5,394,546 A | 2/1995 | Hanatsuka | 395/600 |
| 5,406,557 A | 4/1995 | Baudoin | 370/61 |
| 5,410,646 A | 4/1995 | Tondevold et al. | 395/149 |
| 5,438,565 A | 8/1995 | Hemmady et al. | 370/60 |
| 5,522,066 A | 5/1996 | Lu | 375/600 |
| 5,524,253 A | 6/1996 | Pham et al. | 395/800 |
| 5,557,798 A | 9/1996 | Skeen et al. | 395/650 |
| 5,608,874 A | 3/1997 | Ogawa et al. | 395/200.15 |
| 5,680,551 A | 10/1997 | Martino, II | 395/200.15 |
| 5,694,580 A | 12/1997 | Narita et al. | 395/500 |
| 5,761,200 A | 6/1998 | Hsieh | 370/364 |
| 5,790,809 A | 8/1998 | Holmes | 395/200.58 |
| 5,793,771 A * | 8/1998 | Darland et al. | 370/467 |
| 5,802,312 A | 9/1998 | Lazaridis et al. | 395/200.68 |
| 5,812,669 A | 9/1998 | Jenkins et al. | 380/25 |
| 5,825,865 A | 10/1998 | Oberlander et al. | 379/211 |
| 5,826,017 A * | 10/1998 | Holzmann | 709/230 |
| 5,848,415 A | 12/1998 | Guck | 707/10 |
| 5,870,605 A | 2/1999 | Bracho et al. | 395/682 |
| 5,873,084 A | 2/1999 | Bracho et al. | 707/10 |
| 5,893,911 A | 4/1999 | Piskiel et al. | 707/10 |
| 5,913,061 A | 6/1999 | Gupta et al. | 395/680 |
| 5,916,307 A | 6/1999 | Piskiel et al. | 709/300 |
| 5,966,531 A | 10/1999 | Skeen et al. | 395/683 |
| 6,006,258 A | 12/1999 | Kalajan | 709/219 |
| 6,021,443 A | 2/2000 | Bracho et al. | 709/241 |
| 6,034,970 A | 3/2000 | Levac et al. | 370/466 |
| 6,038,601 A | 3/2000 | Lambert et al. | 709/226 |
| 6,091,724 A | 7/2000 | Chandra et al. | 370/390 |
| 6,101,556 A | 8/2000 | Piskiel et al. | 709/313 |
| 6,111,893 A | 8/2000 | Volftsun et al. | 370/466 |
| 6,119,137 A | 9/2000 | Smith et al. | 707/523 |
| 6,130,917 A | 10/2000 | Monroe | 375/295 |
| 6,161,147 A | 12/2000 | Snyder et al. | 709/310 |
| 6,195,662 B1 | 2/2001 | Ellis et al. | 707/103 |
| 6,278,697 B1 | 8/2001 | Brody et al. | 370/310 |
| 6,400,729 B1 * | 6/2002 | Shimadoi et al. | 370/466 |
| 6,453,297 B1 | 9/2002 | Burks et al. | 705/3 |

OTHER PUBLICATIONS

Alder, Mike et al, PNG (Portable Network Graphics), W3C Version 1.0, Oct. 1, 1996. <http://www.w3.org/TR/REC–png> (visited Jul. 15, 2002).

Alder, Sharon et al, Extensible Markup Language (XML), W3C Working Draft, Nov. 14, 1996. <http://www.w3.org/TR/WD–xml–961114.html> (visited Jul. 15, 2002).

Arens, Yigal et al, "Retrieving and Integrating Data From Multiple Information Sources", Information Sciences Institute, University of Southern California.

Bernstein, Philip, Middleware, Communications of the ACM, vol. 39, No. 2, pp 86–98, Feb. 1996.

Brown, Michael, Technical Report Series: "A Memory Model for Case Retrieval by Activation Passing", Department of Computer Science, University of Manchester, pp 1–248, Feb. 1, 1994.

Brielman, Maria et al., "Representing the Hardware Design Process by a Common Data Schema", IEEE 0–8186–2780, pp 564–569, Aug. 1992.

Connolly, Dan, A Lexical Analyzer for HTML and Basic SGML, W3C Working Draft, Jun. 15, 1996. <http://www.w3.org/TR/WD–sgml–lex/> (visited Jul. 15, 2002).

Ciancarini, Paolo, "Coordination Models and Languages as Software Integrators", ACM Computing Surveys, vol. 28, No. 2, Jun. 1996.

Crawford, John, "An Electronic Design Interchange Format", IEEE, Paper 46.1, 0738–100X/84/0000/0683, 1984.

Clark, David, "Architectural Considerations For a New Generation of Protocols", Laboratory for Computer Science, M.I.T., ACM 089791–405–8/90/0009/020, 1990.

Ciancarini, P et al., "Using the Web to Coordinate Distributed Applications", Department of Computer Science, University of Bologna.

Currie, I.F., TDF Specification, Issue 4.0, Jun. 1995.

Davies, N.B. et al., History of Computing. UNCOL (Universal Computer Oriented Language), Math0030—History, Heresy, & Heretics, University of Bath. <http://homepage.ntlworld.com/michael.harley/uncol.html> (visited Jul. 14, 2002).

Dobinson, Elaine, "Remote Access Tool For Earth Science Data", IEEE, Proceedings of the $9^{th}$ International Conference on Scientific and Statistical Database Management, Feb., 1997.

Eurich, John, "A Tutorial Introduction to the Electronic Design Interchange Format", IEEE, $23^{rd}$ Design Automation Conference, Paper 18.1, 0738–100X/86/0000/0327, 1986.

Filer, Nick et al, "Integrating CAD Tools into a Framework Environment Using a Flexible and Adaptive Procedural Interface", Department of Computer Science, The University of Manchester, ACM 0–89791–685–9/94/0011, Sep. 1994.

Gallagher, James et al., "Data Transport Within The Distributed Oceanographic Data System", W3 Journal. <http://www.w3journal.com/1/gallagher.067/paper/067.html> (visited Jul. 15, 2002).

Gaines, Brian R. et al., "Knowledge Acquisition and Representation Techniques in Scholarly Communication", pp 197–206, Knowledge Science Institute, University of Calgary, DOC 95–10/95, ACM 0–89791–713–8/95/0010, 1995.

Gianfagna, Michael, "A Unified Approach to Test Data Analysis", RCA Corporation.

Gettys, Jim, "Hypertest Transport Protocol, HTTP/1.1", Digital Equipment Corporation, Presentation at the World Wide Web Consortium, Oct. 17, 1996.

Haslam, Warren, "Mapping Between Express Models", Computer Aided Design Group, University of Manchester, pp 1–14, May 1996.

Haslam, Warren et al., "A Mapping from EDIF Version 4.0 to Gerber", Department of Computer Science, The University of Manchester, pp 1–6, Nov. 1995.

Haslam, Warren, "A Review of EXPRESS Software Development Toolkits", Computer Aided Design Group, University of Manchester, pp 1–3, 1996.

Hornberger, Patrick, "ANDF Extensions for the Fortran90 Array Operations", Northeast Parallel Architectures Center, Open Software Foundation, Syracuse, N.Y., 1993.

Hutchins, Robert et al., "How to Write and Awk and Perl Scripts to Enable your EDA Tools to Work Together", $33^{rd}$ Design Automation Conference, Las Vegas, NV, ACM 0–89791–833–9/96/0006, 1996.

Johnson, Andrew et al., "The ANDF Technology Program at the OSF RI", Grenoble and Cambridge Research Institutes, pp 1–6, Jun. 29, 1993.

Kahn, Hilary et al. "The Electronic Design Interchange Format EDIF: Present and Future", Department of Computer Science, University of Manchester. $29^{th}$ ACM/IEEE Design Automation Conference, Paper 40.1, 0738–100X/92, pp 666–671, 1992.

Krauskopf, Tim et al, "PICS Label Distribution Label Syntax and Communications Protocols", W3C Recommendation, Oct. 31, 1996. <http://www.w3.org/TR/REC–PICS–labels> (visited Jul. 15, 2002).

Lau, Rachel et al, "Information Modelling of EDIF", 30th ACM/IEEE Design Automation Conference, ACM 0–89791–577–1/93/0006–0278, pp 278–283, 1993.

Li, Wanhoa et al, "A Unified Data Exchange Environment Based on EDIF", 26th ACM/IEEE Design Automation Conference, ACM 0–89791–310–8/89/0006/0803, pp 803–806, Aug. 1989.

Meier, Michael et al, "Experiences with Building Distributed Debuggers", SPDT '96, ACM 0–89791–846–0/96/05, Philadelphia PA, pp 70–79, 1996.

Miller, James et al., "Software Development for the Space Station Freedom Program in the Year 2000", Washington Ada Symposium Proceedings, pp 301–312, Jun. 1990.

Moosa, Zahir, "Practical Inter–Operation of CAD Tools Using a Flexible Procedural Interface", IEEE 0–8186–7165–4/95, pp 34–39, 1995.

Mylopoulos, John et al., "A Generic Integration Architecture for Cooperative Information Systems", Proceedings of the First IFCIS International Conference on Cooperative Information Systems (CoopIS'96), 0–8186–7505–5/96, pp 208–217, 1996.

Nicol, Gavin, "DynaWeb: Interfacing Large SGML Repositories and the WWW", W3 Journal. <http://www.w3journal.com/1/nicol.112/paper/112.html> (visited Jul. 5, 2002).

Oki, Brian et al., The Information Bus—An Architecture for Extensible Distributed Systems, Teknekron Software Systems, Inc., SIGOPS '93/12/93/N.C., ACM 0–89791–632–8/93/0012, pp 58–68, 1993.

Papazoglou, M. et al., "A Translation Protocol Achieving Consensus of Semantics between Cooperating Heterogeneous Database Systems", IEEE, 0–8186–7505, pp 78–89, May 1996.

Peeling, N., "ANDF Features and Benefits", Feb. 5, pp 1–9, 1992.

Port, Graeme et al., "Requirements for Taking Applications Beyond the Enterprise", W3 Journal. <http://www.w3journal.com/1/port.319/paper/319.html> (visited Jul. 5, 2002).

Presotto, David, "UPAS—A Simpler Approach to Network Mail", AT&T Bell Laboratories, Murray Hill, New Jersey 07974, pp 1–6.

Roberts, M., "CEDIF: A Data Driven EDIF Reader", 26th ACM/IEEE Design Automation Conference, ACM 0–89791–310–8/89/0006/081818, pp 818–821, 1989.

Schuster, Hans et al., "A General Framework for the Execution of Heterogenous Programs in Workflow Management Systems", IEEE 0–8186–7505–5/96, pp 104–113, 1996.

Schwartz, Michael et al., "Supporting Resource Discovery Among Public Internet Archives Using a Spectrum of Information Quality", Department of Computer Science, University of Colorado, pp 1–17, Sep. 1990.

Shahdad, Moe, "An Interface Between VHDL and EDIF", CAD Language Systems, Inc., 24th ACM/IEEE Design Automation Conference, ACM 0738–100X/87/0600–0472, pp 472–478, 1987.

Strand, Eric et al., "Applications Thrive on Open Systems Standards", StandardView vol. 2, No. 3, pp 148–154, Sep. 1994.

Whitaker, Nigel et al., "EDIF/CFI Interoperability", Department of Computer Science, University of Manchester.

Whitaker, Nigel, "HDL Support Software", MINT Group, Department of Computer Science, University of Manchester, pp 1–9, 1996.

Whitaker, Nigel, "PCD Benchmark Conversion", MINT Group, Department of Computer Science, University of Manchester, pp 1–7, 1996.

Whitaker, Nigel, "Status Report on EDA Benchmarks", MINT Group, University of Manchester, Document No. STEED/T1/01/4, pp 1–19.

Wiederhold, Gio, "Mediators in the Architecture of future Information Systems", Stanford University, Sep. 1991 (an edited version of the report was published in The IEEE Computer Magazine, Mar. 1992), pp 1–36.

"A Guide to the TDF Specification", Issue 4.0, Defense Research Agency, St. Andrews Road, Malern, Morcestershire, United Kingdon WR14 3PS, Crown Copyright, Jun. 1995.

"Boulder IO", Massachusetts Institute of Technology, Genome Software. <http://www–genome.wi.mit.edu/genome_software/other/boulder.html> (visited Jul. 15, 2002).

"Description of LPM Modules", LPM 2 2 0.

EDIF Newsletter, Issue 2, No. 2, Jun. 1994.

EDIF Newsletter, Sep. 1994.

EDIF Newsletter, Issue 3, No. 1, Feb. 1995.

EDIF Newsletter, Jun. 1995.

EDIF Newsletter, Aug. 1995.

"Instantiating LPM in EDIF", LPM 2 2 0.

"Open Applications Group Integrations Specification", Open Applications Group, Incorporated, Document No. 1996.02.02, Version 1.002.0.

"Report of Working Group on Data Exchange Formats", SoftNexx'94 Data Formal Report. <http://www.neutron.anl.gov/SoftNeSS/SoftNeSS report 1.html> (visited Jul. 15, 2002).

"1994 IEEE Symposium on Emerging Technologies and Factory Automation Proceedings", Institute of Industrial Science, The University of Tokyo, Nov. 6–10, 1994.

Belville, S., "Zephyr on Athena", Athena Documentation, Version 3, Sep. 10, 1991.

Biby, D., "EDI or DIE: Will Your Corporation Be Ready for the 21st Century?", p. 10–15.

Birman, K. et al., "Exploiting Virtual Synchrony In Distributed Systems", Department of Computer Science, Cornell University, ACM 089791–242–X/87/0011/0123, pp. 123–138, 1987.

Birman, K., "ISIS Documentation: Release 1", Department of Computer Science, Cornell University, Ithaca, New York, 14853–7501, Jul. 1987.

Birman, K. et al., "ISA Project: A Model for Interface Groups", Advanced Networked Systems Architecture, pp. 49–76, Sep. 14, 1990.

Birman, K., "The ISIS System Manual", The ISIS Project, Mar. 15, 1988.

Birman, K. et al, "Programming Your Way Out of the Past ISIS and the META Project", SunTechnology, pp. 90–104, Summer 1989.

Birman, K. et al., "Reliable Communication in the Presence of Failures", ACM Transactions on Computer Systems, vol. 5, No. 1, pp. 46–76, ACM 0734–2071/87/0200–0047, pp. 49–76, Feb. 1987.

Blackwell, T., "Fast Decoding of Tagged Message Formats", Division of Applied Science, Harvard University, IEEE, 0743–166X/96, pp. 224–231, 1996.

Blattner, M. et al., "A User Interface for Computer–Based Message Translation", IEEE, 0073–1129/89/0000/0043, pp. 43–51, 1989.

Collyer, G. et al., "News Need Not Be Slow", USENIX Technical Conference Proceedings, Washington, D.C., Winter 1987.

DellaFera, C. et al., "The Zephyr Notification Service: Section E.4.1", Project Athena Technical Plan, Massachusetts institute of Technology, pp. 1–35, Jun. 5, 1999.

DellaFera, C. et al., "The Zepher Notification Service", Winter 1988 USENIT Conference, pp. 1–9, Feb. 1988.

EDI Forum: The Jornal of Electronic Data Interchange, "EDI Vendor Viewpoints".

Ekiz, H. et al., "Performance Analysis of a CAN/CAN Bridge", School of Engineering, University of Sussex, IEEE, 0–8186–7453–9/96, pp. 181–188, 1996.

Emmelhainz, M., "Electronic Data Interchange: A Total Management Guide".

Frank, A. et al., "Multicast Communication on Network Computers", IEEE Software, 0740–7459/85/0500/0049501, May 1985.

French, R., "The Zephyr Programmer's Manual", Protocol Version ZEPH0.2, p. 1–82, Apr. 1989.

Gerson, G., "The Integration of EDI into the Corporate Information Structure", The Emergence of EDI: Electronic Data Interchange, vol. 1, The Information Systems Control Foundation, pp. 44–45, 1990.

Gibbons, P., "A Stub Generator for Multilanguage RPC in Heterogeneous Environments", IEEE Transactions on Software Engineering, vol. SE–13, No. 1, 0098–5589/87/0100–0077, pp. 77–87, Jan. 1987.

Gordon, R., "Providing Multiple–Channel Communication Using the Experimental Digital Switch", IEEE Transactions on Communications, vol. COM–30, No. 6, 0090–6778/82/0600/1409, pp. 1409–1416, Jun. 1982.

Hughes, L. "A Multicast Interface for UNIX 4.3", Computing Laboratory, The University of Newcastle upon Tyne, 0038–0644/88/010015, pp. 15–27, 1988.

IBM Technical Disclosure Bulletin, "Revisable Form Document Conversation", vol. 28, No. 5, Oct. 1985.

Jones, K., "Supply Chain Security: Striking the Right Balance."

Kantardzic, M. et al., "Graphical Knowledge Based Electronic Mail System", IEEE, CH2964–5/91/000–1165, pp. 1165–1168, 1991.

Kiencke, U., "Serial Communication Network Among Distributed Microcontrollers", 1986.

Kimbrough, S., "On Semantically–Accessible Messaging in an Office Environment", University of Pennsylvania, IEEE, 0073–1129/89/000/0566, pp. 566–574, 1989.

Kutten, L.J. et al., "Electronic Contracting Law: EDI and Business Transactions", Chapter 4: The Mechanics of a Typical EDI Transaction, pp. 8–8 to 8–10.

Lum, V. et al., "A General Methodology for Data Conversion and Restructuring", IBM Joint Research Development, vol. 20, No. 5, pp. 483–497, Sep. 1976.

Malone, T. et al., "Intelligent Information–Sharing Systems", Communications of the ACM, vol. 30, No. 3, pp. 390–402, May 1987.

Marathe, M. et al., "Performance of a MAP Network Adapter", IEEE Network, 0890–8044/88/0005–0082, vol. 2, No. 3, pp. 82–89, May 1988.

Mazer, M. et al., "Logical Routing Specification in Office Information System", ACM Transactions on Office Information Systems, vol. 2, No. 4, Oct. 1984, pp. 303–330, 0734–2047/84/1000–0303, Oct. 1984.

Motiwalla, L. et al., "A Knowledge–Based Mail System to Support Managerial Activities", University of Arizona, IEEE, 0073–1129/89/0000/0650, pp. 650–658, 1989.

Nagao, Y. et al., "Net–Based Cooperative Control for Autonomous Distributed Systems", System Technology Development Center, Kawasaki Heavy Industries, Ltd., IEEE, 0–7803–2114–6/94, pp. 350–357, 1994.

Neufeld, G. et al, Article concerning Syntax One (ASN.1), pp. 393–415.

Neve, J.J.L., "Computers in Industry", Issue 29, pp. 159–168, 1996.

Palme, J., "Distribution Agents (Mailing Lists) In Message Handling Systems", Elsevier Science Publishers B.V., North–Holland, pp. 117–131, 1986.

Parunak, H. et al., "MAPCon: An Expert System to Configure Communications Networks", CD2712–8/89/0000/0023, IEEE, pp. 23–28, 1989.

Paulk, M., "The ARC Network: A Case Study", IEEE Software, 0740–7459/85/0500/0062, May 1985.

Pimentel, J.R., "Efficient Encoding of Application Layer PDU's For Fieldbus Networks", Fraunhofer–Institut fur Informations–und Datenverarbeitung–IITB.

Pleinevaux, P., "MicroMMS: A Compact Abstract Syntax for MMS", Computer Engineering Dept., Swiss Federal Institute of Technology, IEEE, 07803–2114–6/94, 1994.

Raja, P. et al., "Design and Implementation of a Robust Fieldbus Protocol", Laboratoire d'informatique, IEEE, 0–7803–1227–9/93, 1993.

Ramos, C., "An Architecture and a Negotiation Protocol for the Dynamic Scheduling of Manufacturing Systems", Instituto Superior de Engenbaria, IEEE, 1050–4729/94, 104.

Reiss, S., "Integration Mechanisms in the Field Environment", Brown University, Computer Science Department, Technical Report No. CS–88–18, Oct. 1988.

Schutz, H., "The Role of MAP in Factory integration", IEEE Transactions on Industrial Electronics, vol. 35, No. 1, 0278–0046/88/0200–0006, Feb. 1988.

Tanenbaum, A. et al, "A Retrospective and Evaluation of the Amoeba Distributed Operating System", Dept. of Mathematics and Computer Science, Vrije Universiteit, De Boelelaan 1081, 1081 HV Amsterdam, The Netherlands, pp. 1–25.

Tsichritzis, R. et al., "A System for Managing Structured Messages", IEEE Transactions on Communications, vol. COM–30, No. 1, Jan. 1982.

Virdhagriswaran, S. et al, "Manufacturing Collaboration Resource Discovery System", Crystaliz Inc., IEEE, 1080–1383/95, pp. 117–126, 1995.

Vitria Technology Inc., "Vitra Implementation Process Methodology White Paper", 945 Stewart Drive, Sunnyvale, CA 94086.

Vitria Technology Inc., "Vitra Collaborative Information Model (CIM)", 945 Stewart Drive, Sunnyvale, CA 94086.

Ward, K., "EDI and Translation Software Products", EDI Forum: The Journal of Electronic Data Interchange, 1989 Issue.

Weaver, A. et al., "Computer Communications for Factory Automation", Computer Networks Laboratory, University of Virginia, IEEE, 0–7803–1227–9/93, pp. 413–418, 1993.

"New Era of Networks Announces Immediate Availability of Enterprise Software for Application Integration; NOENet Release 2.3 Delivers Connectivity to Multi–Vendor Computing Environments," Business Wire, Business Editors & High Tech Writers, Jul. 15, 1996.

"NEW PRODUCTS", Electronic Commerce News, Phillips Business Information, Inc., Aug. 18, 1997.

"Prior Art Statement of Corporate Express," United States District Court Northern District of Illinois Eastern Division, Civil Action No. 02 C 6355, iWork Software, LLC v. Corporate Express Inc.

"Release Bulletin Enterprise Messaging Services (EMS™) Release 3.3 for DOS, Windows, and UNIX," Sybase Inc., 1989–1996, pp. 1–6, Jul. 15, 1996.

"Road Map to Developing ActiveWeb Applications," Roadmap.fm (02–C–6355 N.D. Ill), pp. 1–2, Dec. 18, 1996.

"Smooth Integrator", *Informationweek*, CMP Media Inc., Aug. 4, 1997.
"Startup testing C/S tier to create Net–ready apps; Active Software's ActiveWeb Developer Suite database middleware; Product Announcement," *ASAP*, Information Access Company, a Thompson Corporation Company, Jul. 8, 1996.
"Stipulated Dismissal with Prejudice and Order for Entry of Judgment," In the United States District Court For the Northern District of Illinois Eastern Division, Civil Action No. 02 C 6355, *iWorks Software, LLC v. Corporate Express, Inc.*
*The ActiveWeb C Programmer's Guide and Reference: ActiveWeb 1.2*, Active Software, Inc., Part No. M0003–122496, 1996.
"The Corporate Computing Environment," ActiveWeb Inc., pp. 1–19.
"Today's Question: What Are We In The Middle Of Now?," *Network Computing*, CMP Media Inc., Dec. 1, 1996.
*Visual Java User's Guide: ActiveWeb 1.2*, Active Software, Inc., Part No. M0006–122496, pp. 1–90, 1996.
"Web Middleware Tolls the Death Knell of HTTP", *Network Computing*, CMP Media Inc., Sep. 15, 1996.
"ActiveWeb Links Java, Corporate Data", *InternetWeek*, CMP Media Inc., Jul. 8, 1996.
"ActiveWeb middleware links apps and browsers", *Computerworld*, Computerworld, Inc., Jul. 8, 1996.
"ActiveWeb middleware ties together disparate systems" *Infoworld*, Infoworld Media Group, Aug. 11, 1997.
"ActiveWeb Supports Microsoft Windows NT and SQL Server; Free 30–day Evaluation Copy Available on the Internet" *Business Wire*, Business Wire, Inc., Oct. 1, 1996.
"ActiveWeb Supports Microsoft Windows NT and SQL Server" *M2 PRESSWIRE*, M2 Communications, Ltd., Oct. 2, 1996.
"Active Web pulls E–business together; Active Software introduces ActiveWeb 2.0 Brief Article; Product Announcement," *ASAP*, Information Access Company, A Thompson Corporation Company, Sep. 12, 1997.
"Briefly noted; News Briefs; Brief Article" *ASAP*, Information Access Company; a Thompson Corporation Company, Jul. 1, 1996.
*Broker Admin User's Guide: ActiveWeb 1.2*, Active Software, Inc., Part No. M0001–122496, pp. 1–80, 1995.
*Developing Event–based Applications: ActiveWeb 1.2*, Active Software, Inc., Part No. M0002–122496, pp. 1–94, 1995.
*Enterprise Messaging Services (EMS™) Developer's Guide*, EMS Release 3.3, Sybase Inc., 6475 Christie Ave, Emmeryvill, CA, 94608, Document ID: 36315–01–0330–01, revised Jul. 15, 1996.
*Enterprise Messaging Services (EMS™) Installation Guide*, EMS Release 3.3, Sybase Inc., 6475 Christie Ave, Emmeryvill, CA, 94608, Document ID: 36315–01–0330–01, revised Jul. 15, 1996.
*Enterprise Messaging Services (EMS™) Developer's Guide*, EMS Release 3.4, Sybase Inc., 6475 Christie Ave, Emmeryvill, CA, 94608, Document ID: 36315–01–0340–01, revised Dec. 31, 1996.
"Internet Middleware; ActiveWeb" *Network Computing*, CMP Media Inc., May 1, 1997.
*Introduction to the ActiveWeb System: Active Web 1.2*, Active Software, Inc., Part No. M0004–122496, pp. 1–36, 1996.
"Linking Legacy Systems and Net Technology" *Internet Week*, Phillips Business Information Inc., Jul. 1, 1996.

"New Era of Networks Provides IBM MQSeries Users with Complete Packaged Solution for Enterprise Application Integration; New Era of Networks Becomes IBM BESTeam Partner," *Business Wire*, Business Editors & High Tech Writers, Aug. 18, 1997.
"New Era of Networks Announces NEONet Version 2.2; Company Delivers Enterprise Software Product for Application Integration," *Business Wire*, Business Editors & High Tech Writers, Jul. 15, 1996.
"Active Software: Corporate and Product Q & As," pp. 1–6, Aug. 1997.
"Active Software License Agreement," swlicense.fm, Wed., pp. 1–2, Dec. 18, 1996.
"Active Software Active aligns with tech leaders to shape the future of the systems integration industry", M2 PRESSWIRE, M2 Communications, Ltd., Oct. 9, 1997.
"Active Software Announces next generation of ActiveWeb" *M2 PRESSWIRE*, M2 Communications, Ltd., Oct. 9, 1997.
"Active Software Announces Contract with U.S. Department of Transportation for Active Web; ActiveWeb Serves as Core for New Federal Government "Paperless Grants" system" *Business Wire*, Business Wire, Inc., Apr. 8, 1997.
"Active Software Announces Next Generation of ActiveWeb; ActiveWeb extends architecture to integrate information resources across the enterprise", *Business Wire*, Business Wire, Inc., Aug. 11, 1997.
"Active Software Announces Relationship With Netscape to Incorporate Latest Internet Technology Into the ActiveWeb Integration System; Active Software Leverages Netscape ONE, Netscape Communicator and Netscape Suite Spot to Enable Enterprise–Wide Access to Diverse Information Resources", *Business Wire*, Business Wire, Inc., Aug. 18, 1997.
"ACTIVE SOFTWARE: Active Software Sets up European operations", *M2 PRESSWIRE*, M2 Communications, Ltd., May 28, 1997.
"Active Software Brings the Power of ActiveWeb to PeopleSoft Users, Offers Product Demonstration at PeopleSoft User Conference Booth No. 516", *Business Wire*, Business Wire, Inc., Sep. 5, 1997.
"Active Software Completes Second Round of Capital Financing: Investors Include KPCB Java Fund; Lehman Brothers; Robertson, Stephens, Partner Fund; Enterprise Partners; and Sierra Ventures" *Business Wire*, Business Wire, Inc., Apr. 2, 1997.
Active Software Introduces ActiveWeb; Company's First Product Marries World Wide Web, Intranet, Internet and Corporate Legacy Applications, *Business Wire*, Jul. 1, 1996.
"Active Software Markets ActiveWeb to Silicon Graphics; Two Companies Collaborate to Provide Technology for the Corporate Intranet and Internet" *Business Wire*, Jul. 1, 1996.
"Active Software Signs Training Agreement With Paradigm Research; Paradigm to Provide ActiveWeb Training", *Business Wire*, Business Wire, Inc., Jan. 23, 1997.
"Active Software: Early Leader in Integrating Intranets/The Internet With Existing Computing Environments; New Company Introduces Partners, Products and Management Team", *Business Wire*, Jul. 1, 1996.
"ActiveWeb dbAdapter: Overview for DB Administrators and Developers," *Active Web dbAdapter Tech Note*, Active Software, Inc., (M0008–122496) pp. 1–18, 1996.
*ActiveWeb Installation Guide—Active Web 1.2*, Active Software, Inc., Part No. M0005–122496, 1995.
"ActiveWeb Goes on Sale", *Electronic Commerce News*, Phillips Business Information, Inc., Jul. 15, 1996.
Hinners, Bonny, "Mixed Messaging," *LAN Magazine*, pp. 57–58, 60, 64, Jul. 1995.

Hutchinson, Andrew et al., "Electron Data Interchange Standards for Health Care," *Research Report*, Computer Science/Mathematics IBM Research Division (RZ 2756: #89234), pp. 1–11, Oct. 20, 1995.

Johnson, Vicki, "IP Multicast: Making it Happen," *Data Communications*, pp. 76–81, May 21, 1997.

Keshav, Reshma M., "Architecture Integration Elements: Connector Models that Form Middleware," The University of Tulsa, The Graduate School, A thesis submitted in partial fulfillment of the requirements for the degree of Master of Science of Computer Science, 1999.

Keller, Karen et al., "The EDI Implementation Decision: A Small Business Perspective," *Proceedings of the 1997 ACM SIGCPR Conference Apr. 3–5, San Francisco, California, USA*, pp. 70–76, Apr. 1997.

Kutten, L. J. et al., "Chapter 8: Trading Partner Agreements," *Electronic Contracting Law: EDI and Business Transactions*, pp. 8–08–8–10.

LaMonica, Martin, "App Integration: Alchemy or Glue," *INFOWORLD*, pp. 31, 36, Nov. 10, 1997.

Mann, John, "Message–Oriented Middleware," *Network Computing*, pp. 72–74, Nov. 15, 1994.

McClanahan, David, "Client/Server Databases in Interoperability and Distributed Systems," *Network Computing*, pp. CS1, CS6–CS9, Jan. 15, 1994.

Postel, Jonathan B., "Simple Mail Transfer Protocol," Information Sciences Institute of the University of Southern California, RFC 821, pp. 1–68, Aug. 1982.

Postel, J. et al., "File Transfer Protocol (FTP)," Network Working Group Request for Comments: 959, pp. 1–69, Oct., 1985.

Rao, Bindu Rama, "Making the Most of Middleware, Keeping Distributed Applications From Bogging Down Means Knowing What's Up with RPC's and Message Oriented Middleware," *Data Communications*, pp. 89–96, Sep. 1995.

Sheppard, Gordon, "Experiences Developing a Bank Loan System," *Conference on Object Oriented Programming Systems Languages and Applications*, ACM Press (1–58113–037–6), New York, NY, pp. 27–32, 1997.

Socolofsky, T. et al., "A TCP/IP Tutorial," Network Working Group Request for Comments: 1180, pp. 1–28, Jan. 1991.

Stedman, Craig, "ActiveWeb Middleware Links Apps and Browsers," *ComputerWorld*, pp. 46, Jul. 8, 1996.

Uhlig, Ronald et al., "The Office of the Future Communication and Computers," *Monograph Series of International Council for Computer Communications vol. 1*, North–Holland Publishing Co., pp. 64–67, 1979.

Van Steelandt, Carl, "AMI: An Intelligent Message Routing System," *Conference with Presentation of Prototypes and Operational Demonstrations, MIT, vol. 1*, pp. 408–423, Mar., 21–24, 1988.

A Model for Interface Groups, *ACM Transactions on Computer Science*, vol. 5 No. 1, Feb., 1987.

Agrawal, R., "ODE (Object Database and Environment): The Language and the Date Model," AT&T Bell Laboratories, Murray Hill, NJ 07974, ACM 0–89791–317–5/89/0005/0036 $1.50, 1989.

Berners–Lee, T. et al., "Hypertext Transfer Protocol—HTTP/1.0," Network Working Group Request for Comments: 1945, Category: Informational, pp. 1–60, May 1996.

Best, Reginald P. et al., "Host Weds Switch—Produces Intelligent Call Distributor," *TELEMARKETING*, Teleos Communications, Inc., pp. 30–31, 34, Aug. 1991.

Borenstein, et al., "MIME (Multipurpose Internet Mail Extensions): Mechanisms for Specifying and Describing the Format of Internet Message Bodies," Network Working Group Request for Comments: 1341, pp. 1–66, Jun. 1992.

Cox, John, "User–designed Middleware Plays by the Rules," *Network World*, pp. 1, 64, Jul. 22, 1996.

Cupito, Mary C., "System Integration: Revving up the Interface Engines," *Health Management Technology*, vol. 18, No. 13, pp. 18–20, 22, 58, Dec. 1997.

Desmond, Edward W., "Digital Watch: The Trends and Products that Drive the Tech Industry, How Your Data May Soon Seek You Out", *FORTUNE*, pp. 149–150, Sep. 8, 1997.

Dubuisson, Oliver, *Chapter 2 Applications of ASN.1 (Or: Are You Using Software that Does ASN.1 encodings?)*, OSS Nokalva, pp. 357–387, May 31, 1999.

Dubuisson, Oliver, *ASN.1 Communication Between Heterogeneous Systems*, OSS Nokalva, http://www.oss.com/asn1/booksintro.html, Jun. 5, 2000.

Ehr, Mark, "An Introduction to Messaging Technology," www.polarsoft.com, Polarsoft Limited, Boulder, Colorado, 2000.

Eirund, Helmut; "Knowledge Based Document Classification Supporting Interated Document Handling," *Conference on Supporting Group Work Sponsored by ACM SIGOIS and IEEECS TC–OA on Office information systems*, ACM Press, New York, NY, pp. 189–196, 1998.

Foster, Robin, "Call Center Vision: Crafting Leadership through Discipline," *Customer Service Excellence BCR*, pp. 3–8, Jul. 1995.

Gopisetty, S. et al., "Automated Forms–Processing Software and Services," *IBM J– Res. Develop.*, vol. 40 No. 2, pp. 211–229, Mar. 1996.

Bort, Julie, "Can Message Brokers Deliver?", *Software Magazine*, V16, N6, p70(5), ISSN:0897–8085, Jun. 1996.

Bracho, Rafael, "Mastering Corporate Computing with the ActiveWeb System", Active Software, Inc., 1043 No. Shoreline Blvd., Suite 201, Mountain View, CA 94043, Aug. 2, 1996.

\* cited by examiner

SYSTEM AND METHOD FOR COMMUNICATING DATA

BACKGROUND OF THE INVENTION

This invention relates to systems and methods for communicating data. More particularly, this invention relates to systems and methods for communicating data between a source process and one or more destination processes, in which data are converted from a source format to a standard format, the data are routed from the source process to the one or more destination processes, the data are converted from the standard format to a destination format for each destination process, and receipt of the data is verified at each destination process.

Integrated processing architectures in which a variety of processing systems communicate with each other over a communication network are widely used in commerce. Because of the different communication requirements of each processing system in such architectures, it is frequently necessary to incorporate multiple translation processes into each transmitting or receiving processing system to translate outgoing or incoming data. This necessity becomes particularly burdensome as the variety of source transmission formats or destination transmission formats increases for any processing system. For example, in an architecture comprising four format-unique processing systems A, B, C, and D in which A transmits data to all of B, C, and D, and D receives data from all of A, B, and C, both A and D would need to have three translators each to respectively convert the transmissions to and from the necessary formats.

Another disadvantage with these architectures is that changing, adding, and/or removing sources and/or destinations for data transmissions is difficult because the application processes that generate each copy of the transmissions generated and that perform the corresponding translations, must be modified. These modifications may be particularly problematic to the extent that they introduce potential flaws into the application processes and that they require the modified applications to be taken off-line while being altered.

A further disadvantage with these architectures is that each architecture is usually unique from enterprise to enterprise because of the unique needs and desires of the enterprises, and, therefore, each architecture must be custom built at significant expense in both time and money. For example, in the architecture comprising processing systems A, B, C, and D used as an example above, each processing system would have to be custom built to incorporate the required translators for each of the other systems. Likewise, in another similar architecture comprising processing systems A, B, C, D, and E, each processing system would also have to be custom built to incorporate the required translators for each of the other systems although only one additional system (i.e., system E) makes this architecture different from the first architecture.

In view of the foregoing, it would be desirable to be able to provide a system and method for communicating data between a source process and one or more destination processes which do not require a separate translator on each source or destination processing system for each data format type to be transmitted or received, respectively.

It would be also desirable to be able to provide a system and method for communicating data between a source process and one or more destination processes which do not require an application process to be modified to change, add, or remove a source or destination of a data transmission.

It would be further desirable to be able to provide a system and method for communicating data between a source process and one or more destination processes which do not require an application process to be taken off-line to change, add, or remove a source or destination of a data transmission.

It would be still further desirable to be able to provide a system and method for communicating data between a source process and one or more destination processes that can be implemented in virtually any enterprise architecture without requiring that each processing system of the architecture be custom built.

SUMMARY OF THE INVENTION

It is therefore an object of this invention to provide a system and method for communicating data between a source process and one or more destination processes which do not require a separate translator on each source or destination processing system for each data format type to be transmitted or received, respectively.

It is another object of this invention to provide a system and method for communicating data between a source process and one or more destination processes which do not require an application process to be modified to change, add, or remove a source or destination of a data transmission.

It is still another object of this invention to provide a system and method for communicating data between a source process and one or more destination processes which do not require an application process to be taken off-line to change, add, or remove a source or destination of a data transmission.

It is yet another object of this invention to provide a system and method for communicating data between a source process and one or more destination processes that can be implemented in virtually any enterprise architecture without requiring that each processing system of the architecture be custom built.

In accordance with the present invention, a system and method for communicating data between a source application process and one or more destination application processes, which achieve these and other objects, are provided. More particularly, the system and method of the present invention perform uniform conversion and routing functions which require only a single conversion of all outbound data transmissions regardless of the variety of data destinations and only a single conversion of all inbound data transmissions regardless of the variety of data sources. Through these function, the system and method of the present invention enable changes, additions, and deletions of sources and destinations of data transmissions to be made without modification of a source or destination application process and without taking a source or destination application process off-line. Also, by using uniform conversion and routing functions, this system and method may be implemented in virtually any enterprise architecture without requiring that each processing system of the architecture be custom built.

These conversion and routing functions are performed by first receiving, in a source format and from a source application, data to be transmitted. These data are then converted from the source format to a standard format. Next, one or more destination addresses are identified based upon a transaction type corresponding to the data to be transmitted and/or the address of the source application. After identifying the one or more destination addresses, a copy of the data is then transmitted to each. Upon receipt of each copy of the data at the corresponding destination, the data are then converted from the standard format to a destination format. Lastly, these converted data are passed to a corresponding destination process.

In preferred embodiments of the system and method of the present invention, a receipt acknowledgment function is also performed. This function produces a receipt acknowledgment when transmitted data are received at a destination process. If this acknowledgment is not received at a source process prior to the occurrence of a given number of other transmission attempts or a given time period, an error notification will be generated. This error notification may then trigger an automated process that handles the error or alert a user to the error condition so that manual handling of the error can be accomplished.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
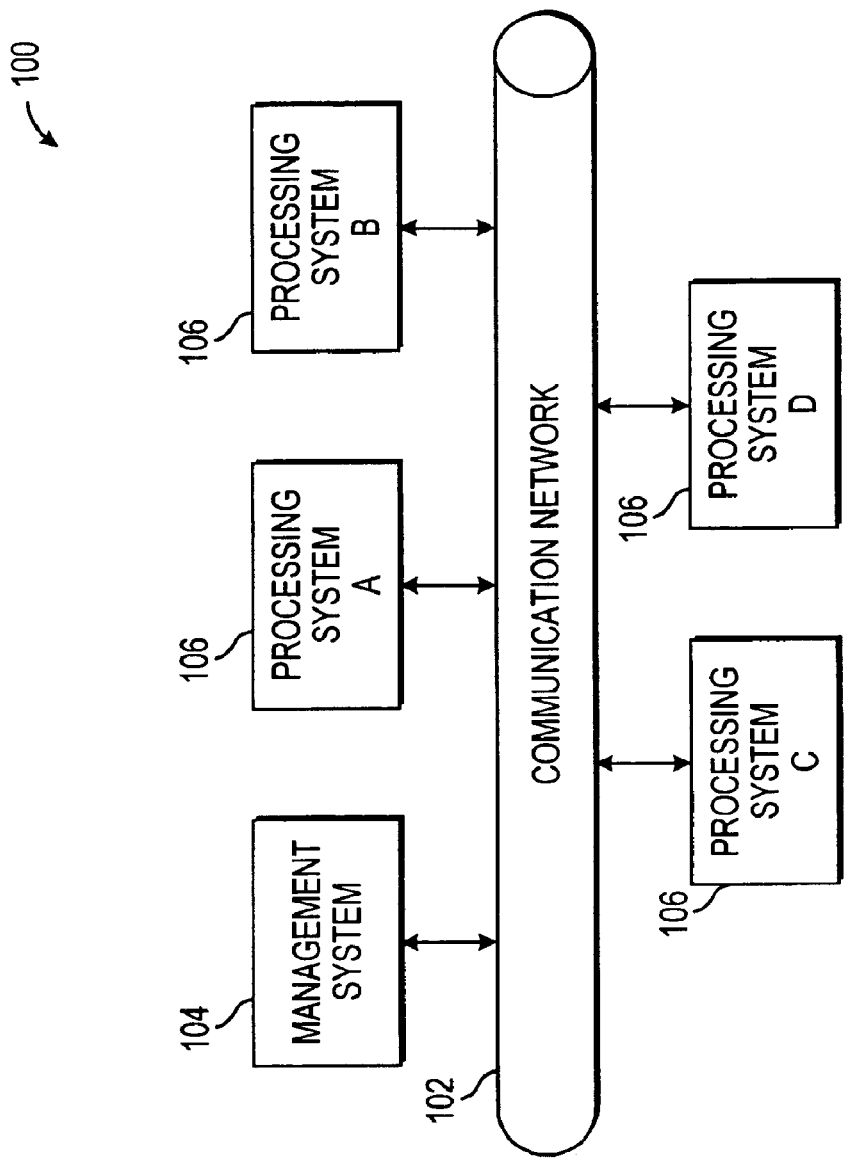
FIG. 1 is a block diagram of an integrated processing architecture in which a communication system in accordance with the present invention may be implemented.

The present invention provides a system and method for communicating data between multiple application processes that are being executed on one or more processing systems connected to a communication network. In communicating data between these application processes, the system and method may perform conversion, routing, and receipt verification functions. Preferably, these functions are performed by inbound and outbound broker processes that are each executed on the one or more processing systems. In preferred embodiments of the present invention, each of these functions may be configured and controlled through a user interface on a management system that is also connected to the communication network.

To facilitate data being communicated between application processes that require the data to be in different formats, the conversion function of the present invention first converts the data from a source format to a standard format, and then converts the data from the standard format to a destination format. The first conversion is preferably performed by an outbound broker process that is executed on a source processing system, and the second conversion is preferably performed by an inbound broker process that is executed on a destination processing system. In performing the first conversion, the outbound broker process first identifies the type of data being transmitted. Based upon the data type identified, the broker process then retrieves formatting rules which dictate how the source data are to be converted. Finally, the data are parsed from the source format and formatted into the standard format according to the formatting rules. Similarly, in performing the second conversion, the inbound broker process first identifies the type of data received. Based upon the data type identified, the broker process then retrieves formatting rules which dictate how the standardized data are to be converted. Finally, the data are parsed from the standard format and formatted into the destination format according to the formatting rules.

Prior to transmission, the outbound broker process also performs a routing function on the data to be transmitted. This routing function eliminates any need for a transmitting application process to identify a destination process for to-be-transmitted data, allows any number of destination processes to receive transmitted data, and enables application processes to be easily added and removed as destinations for transmitted data. In performing this function, the data type of data to be transmitted is first determined. One or more destination processes for the data are then identified from a list in a configuration database that is accessible to the outbound broker process. This identification may be performed, for example, by determining which destination processes listed in the database are indicated as receiving data of the determined data type and/or data from the source application process associated with this outbound broker process. Finally, for each of the identified destinations, a copy of the to-be-transmitted data is constructed and information identifying the corresponding destination process is added to each copy of the to-be-transmitted data so that the data may then be transmitted to each destination.

Through these conversion and routing functions, the system and method of the present invention can achieve the aforementioned objects. For example, only a single translator is required for each source or destination application process because the conversion process is always performing the same conversion regardless of where data is going to or coming from (i.e., the conversion process always converts data from a source format to a standard format or converts data from a standard format to a destination format). As another example, through the combination of the conversion function and the routing function, changes, additions, and deletions of sources and destinations of data transmissions can be made without the modification or shutting-down of an application process because the same conversion function is always performed for all data transmissions sent or received, and because the routing function refers to a database to retrieve the parameters for each particular transmission or reception. As still another example, the system and method of the present invention can be implemented in virtually any enterprise architecture without requiring that each processing system of the architecture be custom built because the conversion process is only dependent upon the application process to which it is being applied, and because the routing function relies on a database for controlling its operation that may be implemented separately from the corresponding application process.

The receipt verification function of the system and method of the present invention monitors whether data transmitted from a source application process to a destination application process by way of an outbound broker process and an inbound broker process is received by the destination application process. If the receipt verification function cannot verify that the transmitted data were received by the destination application process within a given number of other transmission attempts or a given time period, an error notification is generated to alert a user of a transmission failure. In performing the receipt verification function, data are first placed in an outbound data queue in the outbound broker process prior to transmission. After transmission, the outbound broker process listens for a receipt acknowledgment to be generated and transmitted by the inbound broker process of the destination application process. If the acknowledgment is received within a given number of other transmission attempts or a given time period, the transmitted data are removed from the outbound data queue and no further monitoring of this data transmission is performed. As mentioned above, however, if this acknowledgment is not received by the outbound broker process within a given number of other transmission attempts or a given time period, an error notification is generated. This error notification may then trigger an automated process that handles the error or alert a user to the error condition so that manual handling of the error can be accomplished.

To configure and control the processing of these functions of the system and method of the present invention, preferred embodiments may also include a management system that is connected to the communication network. Using this management system, a user may, for example, set up communications to or from new application processes, remove communications from existing application processes, add, remove, or modify data types and formats, add, remove, or modify destinations for any data type, specify criteria for receipt acknowledgment error notification generation, and enable or disable any of the conversion, routing, and receipt verification functions.

One embodiment of the system and method of the present invention is illustrated in more detail in FIGS. 1–10. FIG. 1 shows an integrated processing architecture 100 that may be used to implement the present invention, comprising a communication network 102, a management system 104, and processing systems A–D 106. Communication network 102 is preferably a computer network that supports the TCP/IP communication protocol, however, any suitable network or combination of networks may also be used. Management system 104, as mentioned above, is preferably used in architecture 100 to enable a user to configure and control the functions of the present invention. Although architecture 100 is illustrated as incorporating management system 104, the present invention could also be implemented without management system 104. Processing systems A–D 106 may be any suitable processing equipment that generates data. For example, any of processing systems A–D 106 may be an inventory management system, a financial processing system, a shipping control system, point of sale equipment such as cash registers and/or bar code scanning systems, or a warehouse management system. These systems 106, as well as management system 104, may be implemented on dedicated hardware, a personal computer, a mainframe computer, or any other suitable device or devices. Each of systems 106 may be a unique type of system that executes unique software on unique hardware, or any number or all of systems 106 may be partially or completely identical. Although four systems 106 are illustrated in architecture 100, any number of systems 106 may be used in implementing the present invention.

Figure 2:
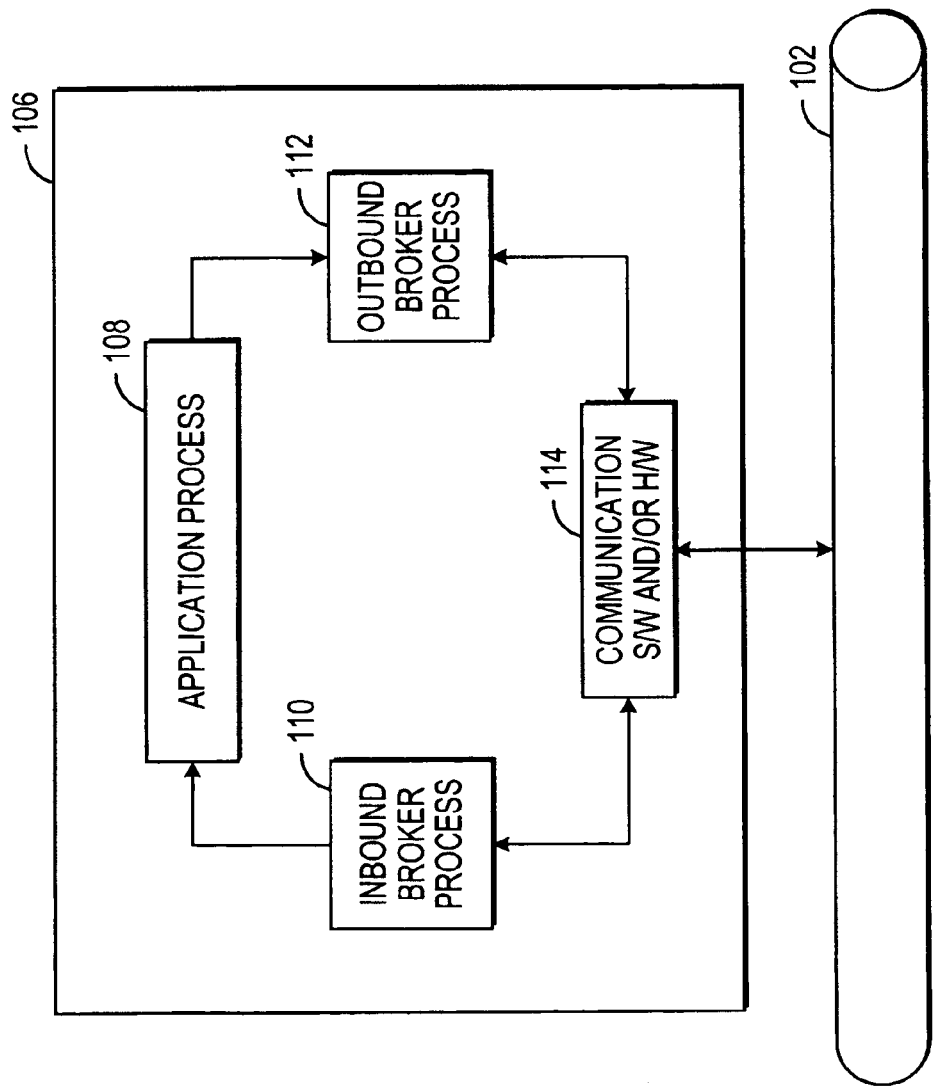
FIG. 2 is a block diagram of processing system implementing a portion of a communication system in accordance with the present invention.

Referring to FIG. 2, one of processing systems A–D 106 is illustrated in more detail. As shown, each system 106 comprises application process 108, an inbound broker process 110, an outbound broker process 112, and communication software and/or hardware 114. Application process 108 may be any suitable software for execution on system 106. For example, if system 106 is an inventory management system, application process 108 may be suitable inventory management software. Inbound broker process 110, as mentioned above, is used to implement portions of the functions of the present invention. For example, inbound broker process 110 may perform conversion and/or receipt verification of data received at processing system 106. Outbound broker process 112, as also mentioned above, is also used to implement portions of the functions of the present invention. For example, outbound broker process 112 may perform conversion, routing, and/or receipt verification of data to be transmitted from processing system 106. Although inbound broker process 110 and outbound broker process 112 are illustrated as being separate processes that are executed on processing system 106, processes 110 and 112 could also be executed in a single process or as any number of individual processes that is or are executed completely on, partially on, or completely off of processing system 106. For example, a single inbound/outbound broker could be implemented on a separate processor connected between processing system 106 and communication network 102. Lastly, communication software and/or hardware 114 may be any suitable combination of software and/or hardware that enables communication over communication network 102. For example, communication software and/or hardware 114 may comprise an Ethernet interface circuit card assembly and suitable driver software.

Figure 3:
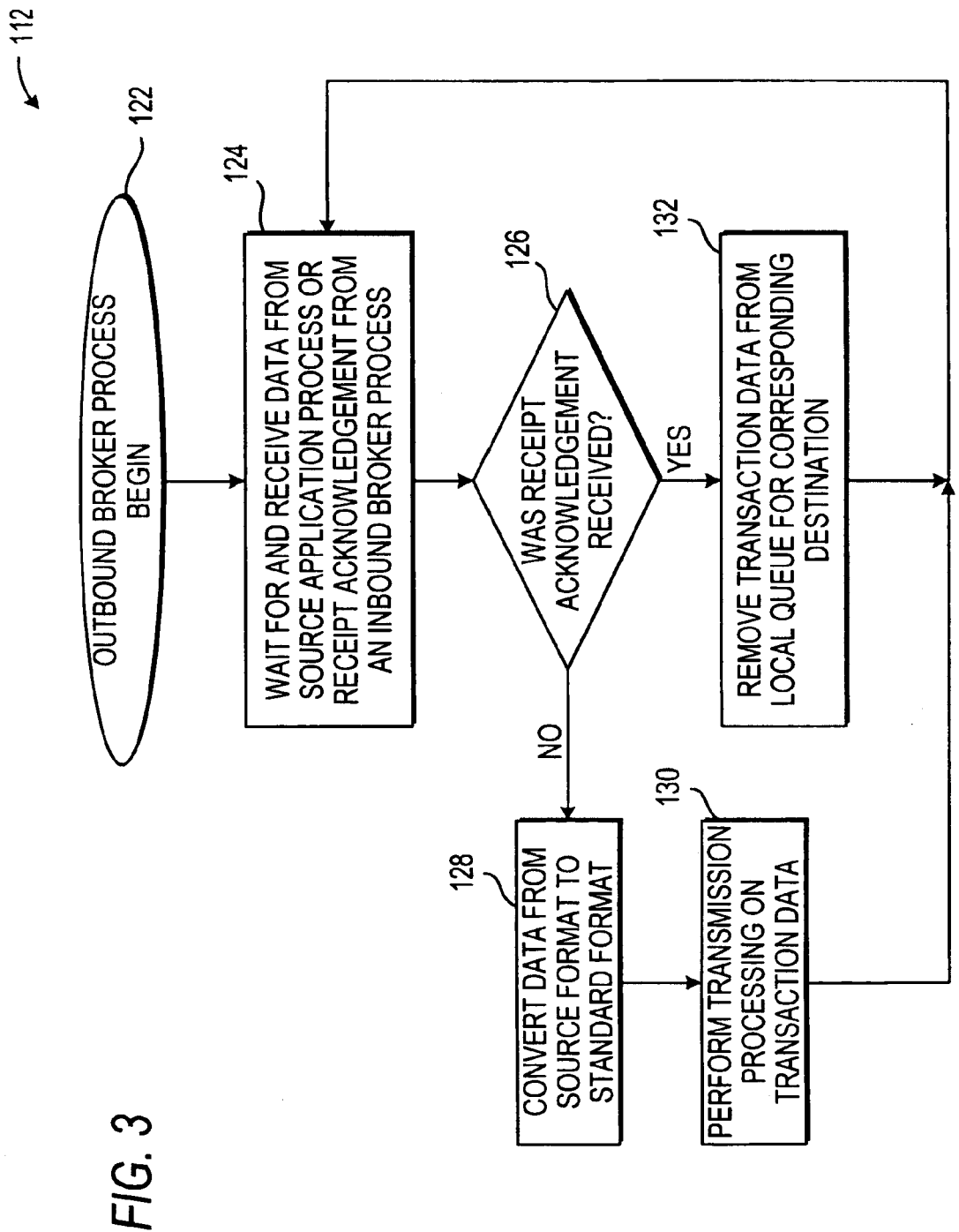
FIG. 3 is a flow diagram illustrating an outbound broker process for sending data and verifying data transmissions in a communication system in accordance with the present invention.

Outbound broker process 112 is illustrated in more detail in FIG. 3. As shown, once process 112 has begun at block 122, process 112 waits for and receives either data from source application process 108 (FIG. 2) or a receipt acknowledgment from an inbound broker process 110 (FIG. 2) of another application process 108 (FIG. 2). After data or a receipt acknowledgment is received at block 124, process 112 proceeds to test 126 to determine whether a receipt acknowledgment was received. If at test 126 a receipt acknowledgment is determined not to have been received, a conversion process is performed on the received data at block 128. This conversion process converts the data from a format associated with source application process 108 (FIG. 2) to a standard format. Once the data have been converted, a transmission process is performed on the data at block 130. This transmission process prepares the data for transmission and transmits the data. If at test 126 a receipt acknowledgment is determined to have been received, the corresponding transaction is recognized as being delivered and the associated data are removed from a local queue corresponding to the transaction's destination at block 132. Finally, after transmitting the data at block 130 or deleting the transaction data from the local queue at block 132, process 112 loops back to block 124 to again wait for and receive data or a receipt acknowledgment.

Figure 4:
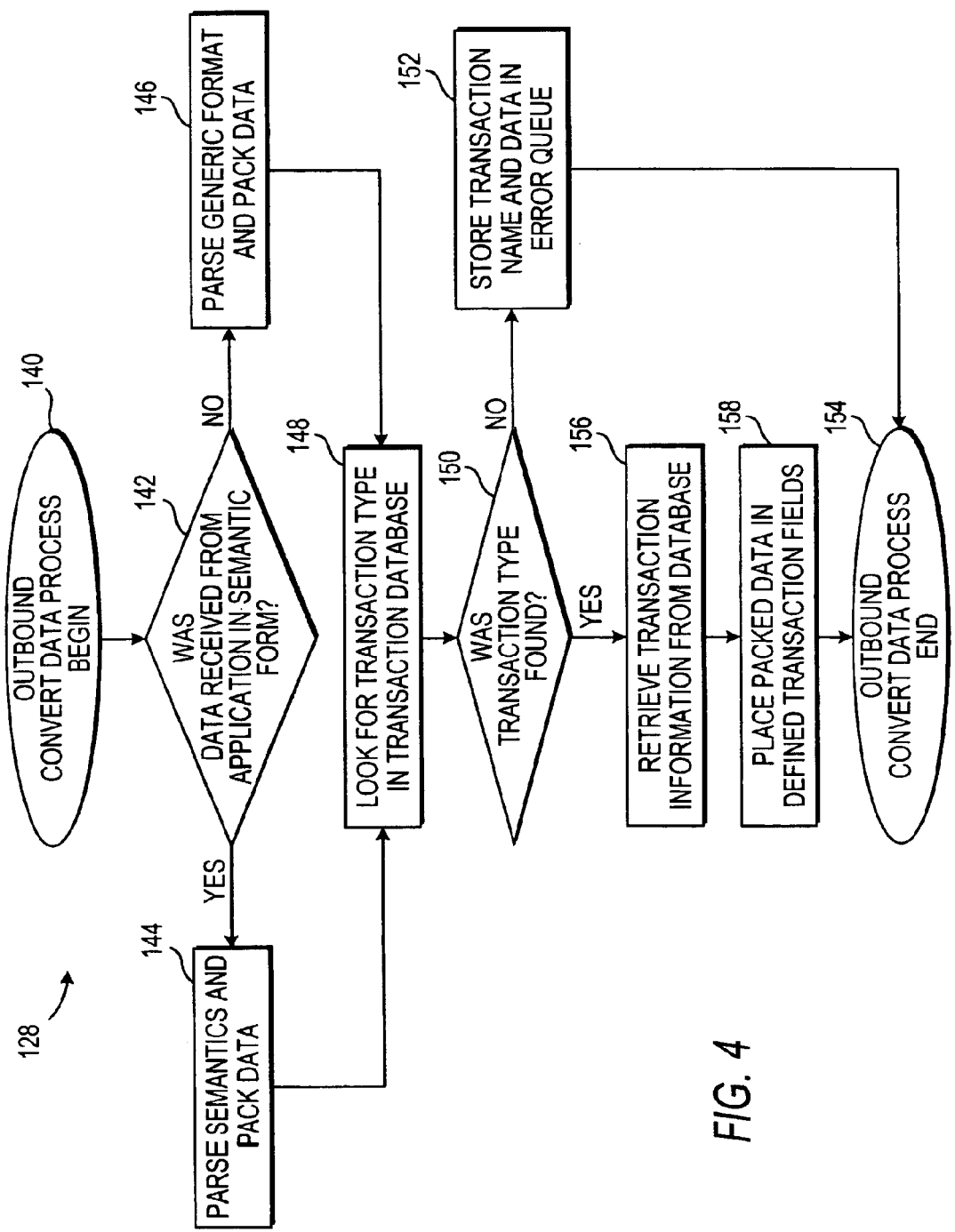
FIG. 4 is a flow diagram illustrating a process for converting data to be sent in a communication system in accordance with the present invention.

FIG. 4 illustrates the conversion process of block 128 of FIG. 3 in more detail. As shown, after this process has begun at block 140, the process first determines whether data to be transmitted were received from source application process 108 (FIG. 2) as a set of semantic assignments or as data in a generic format at test 142. As used herein, a semantic is a set of information that is associated with a piece of data and which includes a label and a set of system specific requirements for the piece of data. For example, a semantic for a piece of shipping data may include a label entitled "to_ location" that indicates that the piece of data represents where a shipment is being sent to, and a set of requirements which dictate that this data may only be assigned values of "dock," "warehouse," "factory," and "store" on a particular system 106 (FIGS. 1–2). When transmitted from an application process 108 (FIG. 2), a semantic assignment for this piece of data may be represented by a string such as "to_location=dock." Data in a generic format may include data passed by a source application 108 (FIG. 2) in any fashion other than as a set of semantic assignments. For example, data for a shipment may be sent in a generic format as a stream of characters separated by a predetermined delimiter such as a pipe character ("|"). If the conversion process determines at block 142 that data were received from an application process as a set of semantic assignments, then the process parses those semantic assignments and packs the data at block 144. Otherwise, the process parses the data from a generic format and packs the data at block 146. The data packing performed in blocks 144 and 146 may be used to remove unnecessary information from a piece of data and may include removing leading zeros from a number and removing trailing spaces from a set of characters.

Once data received from source application process 108 (FIG. 2) have been packed at blocks 144 or 146, the conversion process looks for a transaction type corresponding to the to-be-transmitted data in a transaction database at block 148. This database is preferably stored locally on processing system 106 (FIG. 2) on which outbound broker process 112 (FIG. 3) is being executed. If the transaction type is then determined not to have been found at test 150, the conversion process stores the transaction name and data in an error queue at block 152 and terminates at block 154. Otherwise, if the transaction type is determined to have been found at test 150, then the corresponding transaction information is received from the transaction database at block 156. Finally, the packed data are placed in transaction fields defined by the transaction information at block 158 and the process is completed at block 154.

Figure 5:
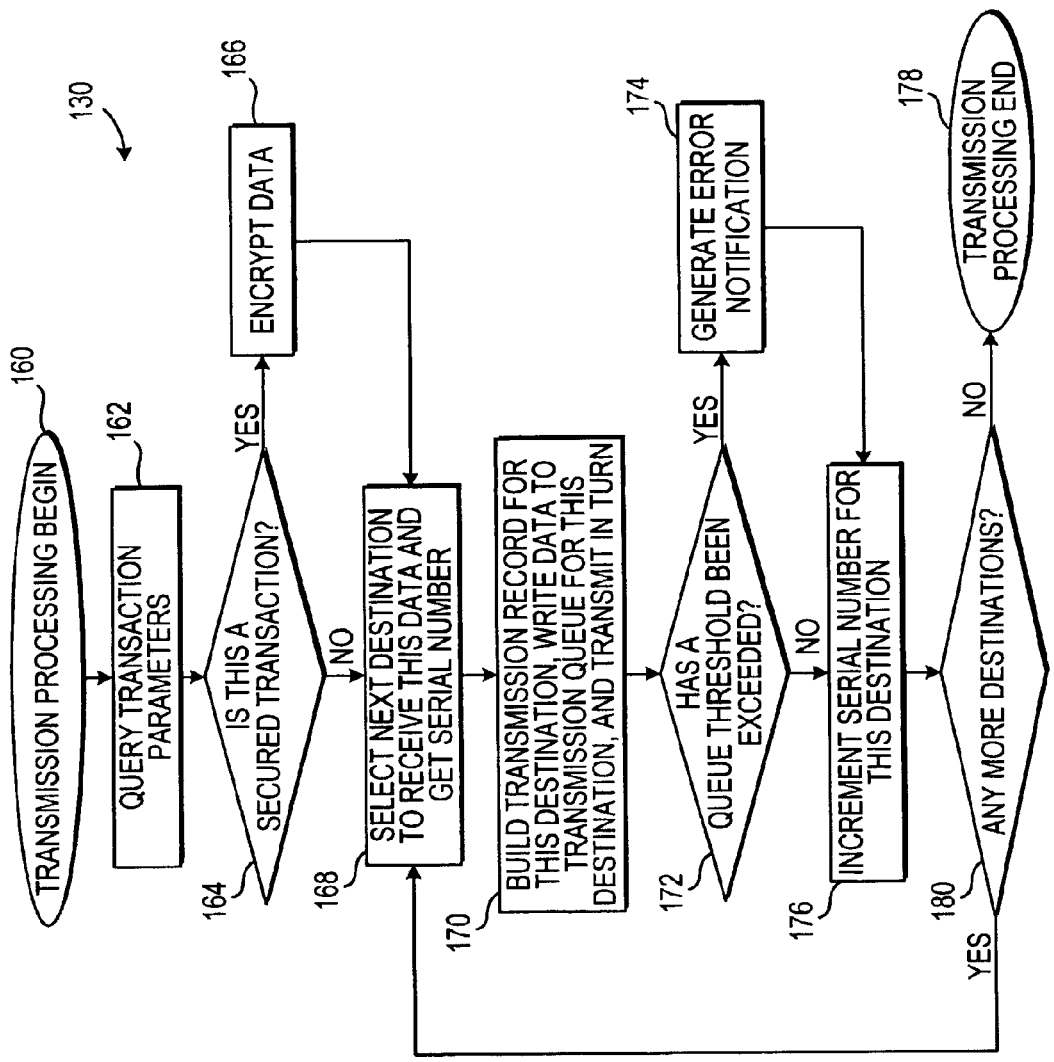
FIG. 5 is a flow diagram illustrating a process for transmitting data in a communication system in accordance with the present invention.

The transmission process of block 130 of FIG. 3 is illustrated in detail in FIG. 5. As shown, once the transmission process has begun at block 160, the process queries the transaction parameters for the data to be transmitted at block 162. These transaction parameters are preferably stored in a database located on the processing system in which outbound broker process 112 (FIG. 3) is being executed, and preferably include a list of the destination addresses for the transaction, whether the transaction is a secure transaction, etc. As stated above, the list of destination addresses for the transaction may be based upon the type of transaction to be transmitted or the particular source of the transaction. Next, at test 164, the process determines whether the transaction is a secure transaction based upon these parameters, and if so, the transaction data are encrypted at block 166. After encryption at block 166 or if the transaction is determined not to be a secure transaction at test 164, the first destination of the transaction is identified and a serial number for the transaction is obtained at block 168. Preferably, this serial number is selected incrementally for each transmission to the same destination from this source. Using incremental serial numbers in this way, allows a destination to recognize a lost transmission from a gap in adjacently received serial numbers from the same source.

Once a destination and serial number are selected, a transmission record is built for this destination, the record is written to a transmission queue, and the record is transmitted to the destination in turn at block 170. This transmission record may be used to identify the source address, the transaction type, whether the data are encrypted, and the date, time, and serial number of the transmission. The transmission record also contains the data to be transmitted. Furthermore, other information may also be included in the transmission recorded depending on the requirements of the specific system in which the present invention is being implemented. The transmission queue to which the data are then written is preferably a dedicated queue that only contains data to be transmitted to the designated destination. This queue is preferably maintained on processing system 106 (FIG. 2) on which outbound broker process 112 (FIG. 3) is being executed, although the queue may alternatively be located elsewhere as well. Once located in the transmission queue, the transaction data will then be transmitted in turn. This is preferably accomplished by transmitting one transaction from each queue for which there are data in a cyclic fashion. Alternatively, however, all or some portion of data for a single transmission queue may be transmitted prior to transmitting data for another queue.

After the transaction data have been placed in the corresponding transmission queue at block 170, the transmission process determines whether a queue threshold for this queue has been passed at test 172. This queue threshold may include a maximum number of entries in the queue, or a maximum amount of time for a queue entry to remain in the queue. A maximum number of entries threshold may be exceeded, for example, when transaction data in the transmission queue have not been deleted because the corresponding receipt acknowledgments have not been received by outbound broker process 112 (FIG. 3). If this threshold is determined to have been exceeded at test 172, an error notification is generated at block 174. After generating this notification at block 174 or if the threshold is determined not to have been exceeded at test 172, the serial number for the designated destination is incremented at block 176. Finally, at test 180, the transmission process determines whether these transaction data need to be transmitted to any other locations, and if so loops back to block 168. Otherwise, the transmission process completes at block 178.

Figure 6:
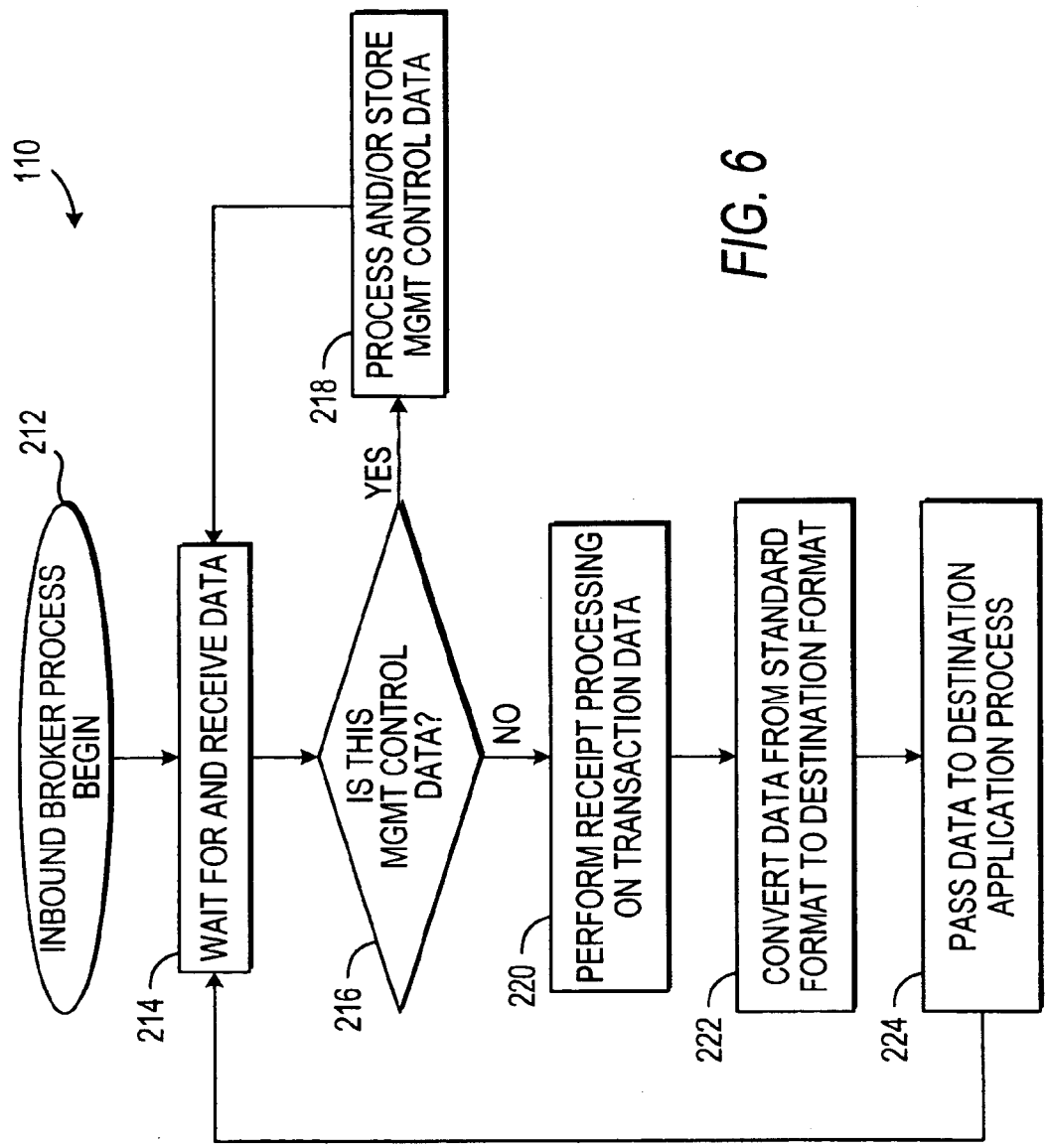
FIG. 6 is a flow diagram illustrating an inbound broker process for receiving data in a communication system in accordance with the present invention.

Referring to FIG. 6, inbound broker process 110 of FIG. 2 is illustrated in detail. As shown, after inbound broker process 110 has begun at block 212, process 110 waits for and receives a data transmission at block 214. This data transmission may include transaction data that are transmitted from an outbound broker process 112 (FIG. 3) of another processing system 106 (FIG. 3) or management control data that are transmitted from a management system 104 (FIG. 1). At test 216, process 110 determines which of these data types was received. If at test 216 management control data are determined to have been received, the data are processed and/or stored at block 218. Preferably, in processing and/or storing this management control data, the control information and configuration of both inbound broker process 110 (FIG. 2) and an outbound broker process 112 (FIG. 2) on processing system 106 (FIG. 2) can be modified.

Alternatively, a separate mechanism may be included in outbound broker process 112 (FIG. 2) to receive and process and/or store this management control data.

If at test 216 the data received are determined not to be management control data, receipt processing is then performed on these data at block 220. Preferably, this receipt processing includes checking the integrity of the data received, generating a receipt acknowledgment for these data, and decrypting the data, if necessary. Once this receipt processing has been performed at block 220, the data are converted from the standard format to a format corresponding to the destination application process 108 (FIG. 2) at block 222. Finally, the data are passed to destination application process 108 (FIG. 2) at block 224, and then process 110 loops back to block 214 to wait for and receive more data. In passing the data to destination application process 108 (FIG. 2), inbound broker process 110 (FIG. 2) may interrupt application process 108 (FIG. 2) to alert it to the presence of the data, or may queue the data for subsequent polling by application process 108 (FIG. 2).

Figure 7:
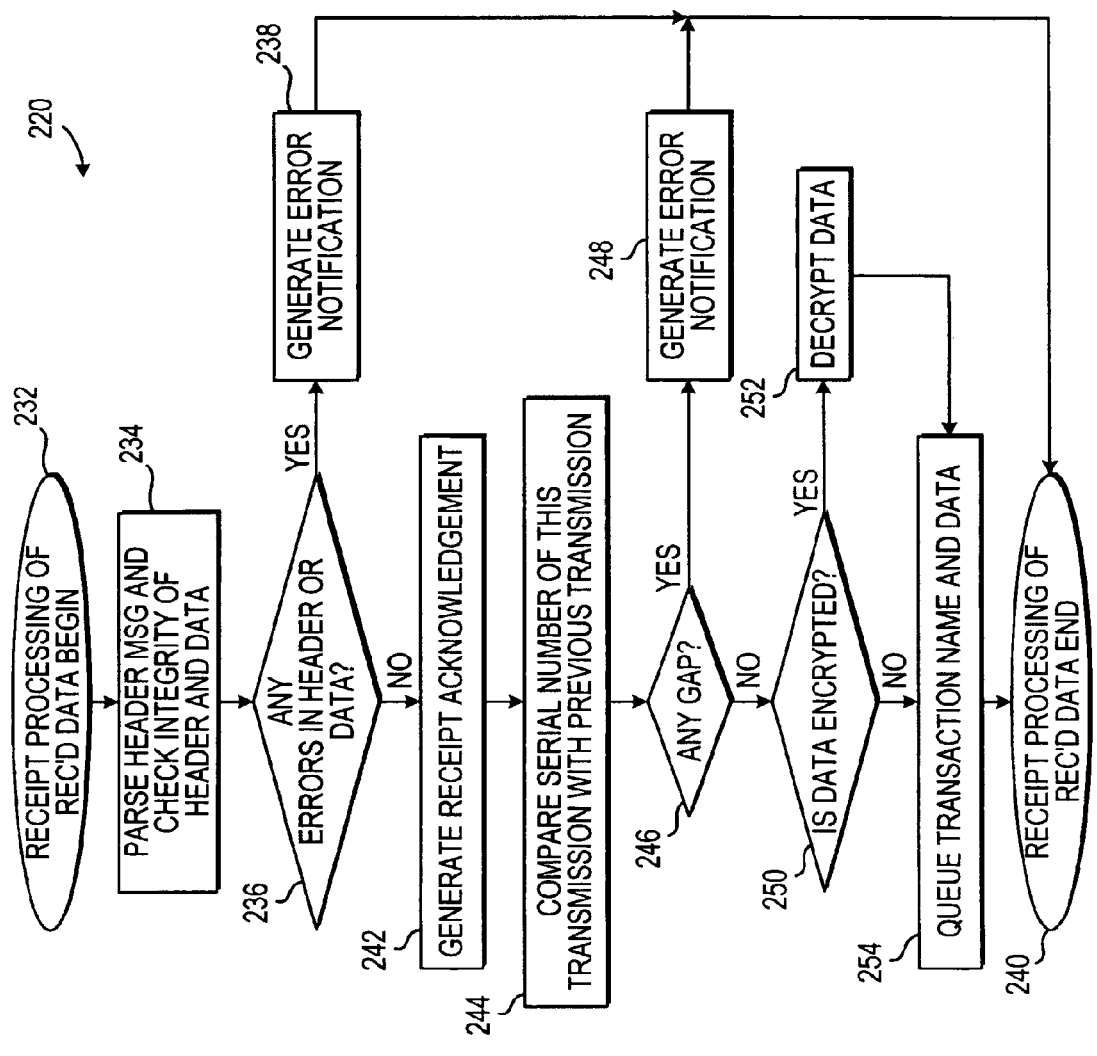
FIG. 7 is a flow diagram illustrating a process for verifying and acknowledging the integrity of data received in a communication system in accordance with the present invention.

The receipt processing performed in block 220 of FIG. 6 is illustrated in detail in FIG. 7. As shown, after the receipt processing of the received data has begun at block 232, the header message is parsed, and the integrity of the header and data is checked at block 234 and test 236. If at test 236 an error is determined to exist in the header or data, then an error notification is generated at block 238 and the receipt processing is terminated at block 240. Otherwise, if at test 236 no errors are detected in the header or data, a receipt acknowledgment is generated at block 242. Once the receipt acknowledgment is generated, the serial numbers of the currently received transaction and the previously received transaction from the same source are checked for a gap at block 244 and test 246. If a gap is detected at test 246, an error notification is generated at block 248 and the receipt processing is terminated at block 240. Otherwise, if no gap is detected at test 246, the processing determines at test 250 whether the data are encrypted from the header, and if so, the data are then decrypted at block 252. If at test 250 the data is determined to not be encrypted at test 250 or after the data have been decrypted at block 252, the transaction name and data are queued for conversion processing at block 254, after which receipt processing is completed at block 240.

Figure 8:
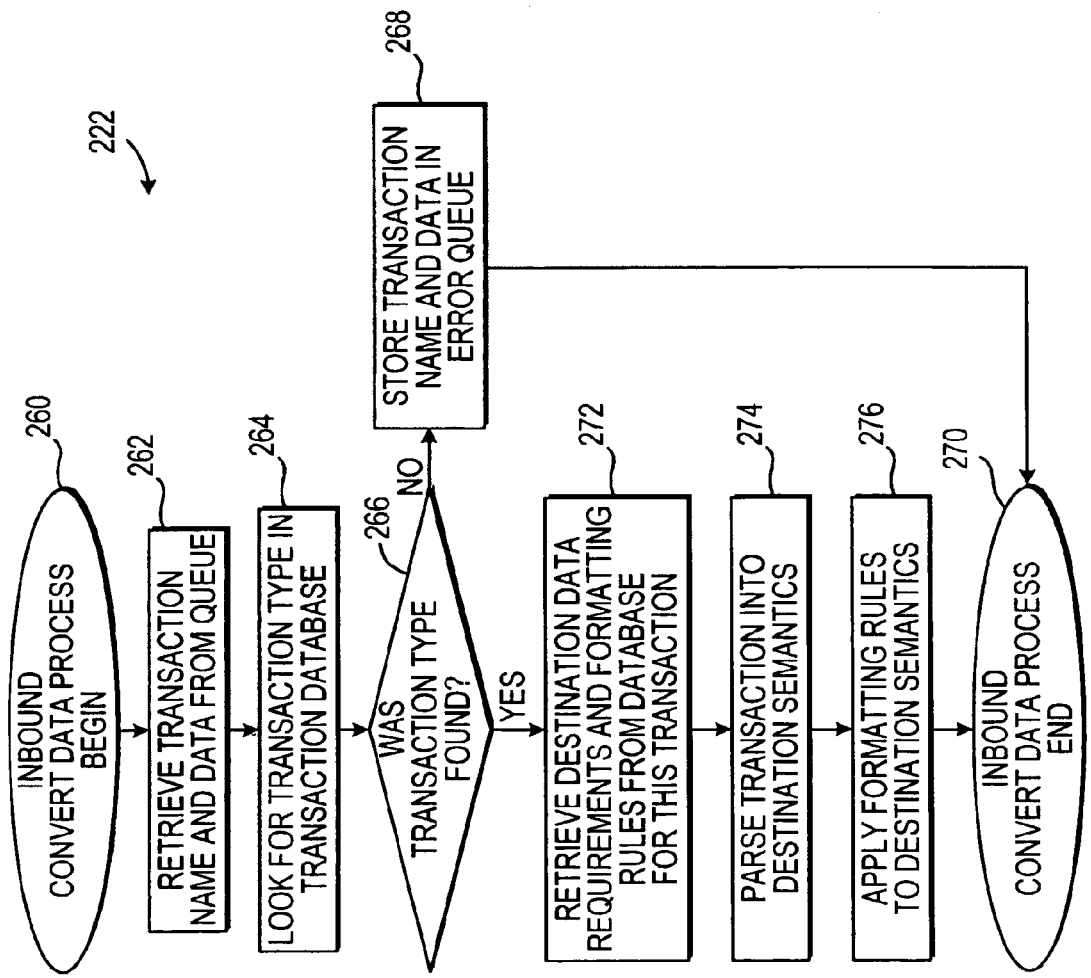
FIG. 8 is a flow diagram illustrating a process for converting received data in a communication system in accordance with the present invention.

The conversion process performed in block 222 of FIG. 6 is illustrated in FIG. 8. As shown, once the conversion processing has begun at block 260, the transaction name and transaction data are retrieved at block 262 from the queue into which these items were placed by block 254 of the receipt processing illustrated in FIG. 7. Next, at block 264 and test 266, the conversion process looks for the transaction type corresponding to this transaction in a transaction database and determines whether the transaction has been found. If the transaction type is determined not to have been found at test 266, the transaction name and data are stored in an error queue at block 268 and the conversion process is terminated at block 270. Otherwise, if the transaction type is determined to have been found at test 266, the destination application process data requirements and formatting rules are retrieved at block 272 for this transaction from the database. After retrieving this information, the transaction is parsed into destination application process semantics at block 274. Finally, the formatting rules are applied to these semantics at block 276 and then the conversion process is completed at block 270.

Figure 9:
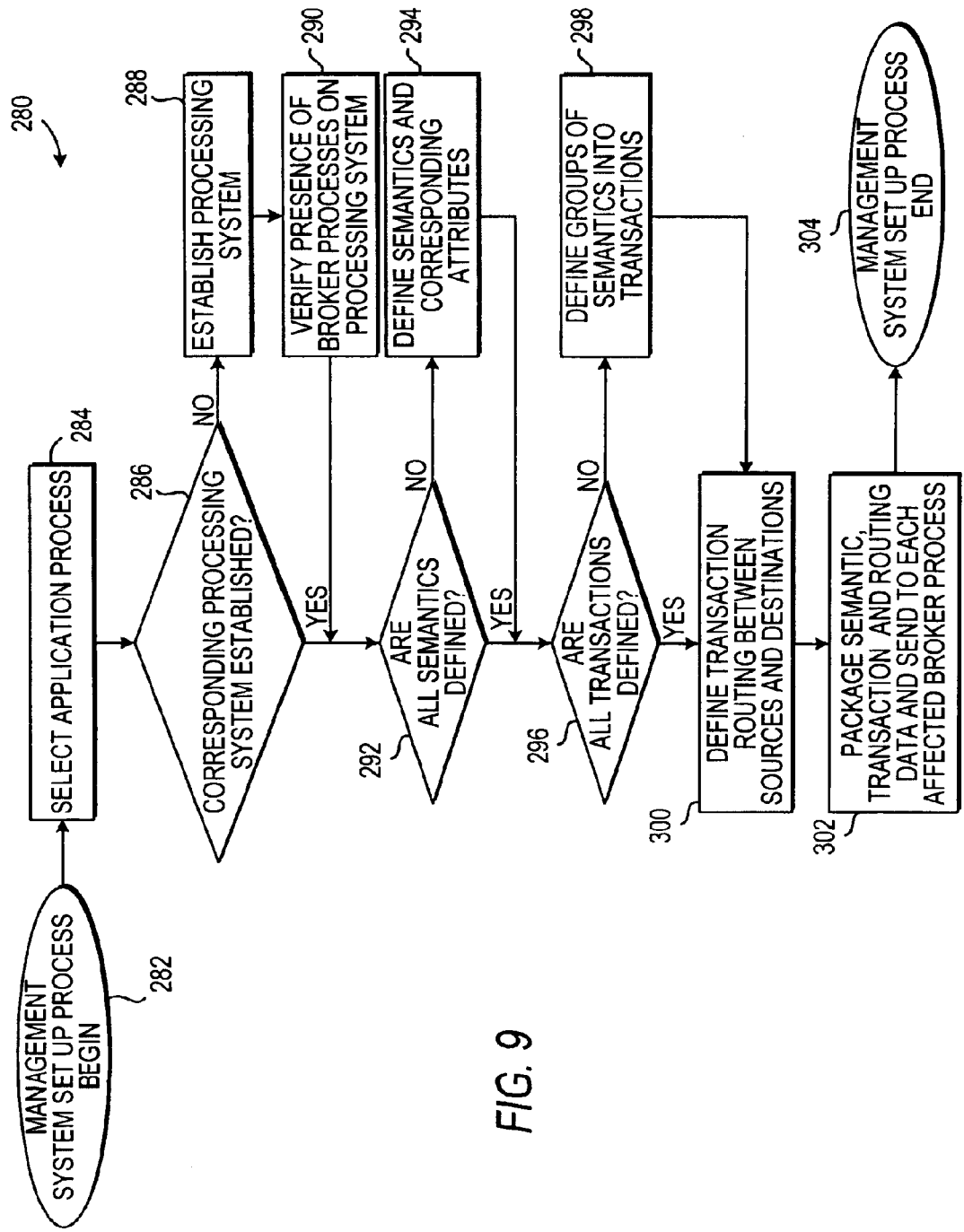
FIG. 9 is a flow diagram illustrating a management system process for setting up a communication system in accordance with the present invention.

A process 280 for execution in management system 104 of FIG. 1 is shown in FIG. 9. As illustrated, after process 280 has begun at block 282, an application process is selected for set up through user input or automatically at block 284. Once an application process has been selected, process 280 determines at test 286 whether inbound and outbound broker processes have been established on the corresponding processing system. If test 286 determines that the broker processes have not been established, then process 280 establishes and verifies these processes at blocks 288 and 290. Once the broker processes have been verified at block 290 or if they were determined to have been established at test 286, process 280 determines whether all of the semantics for the application process have been defined at test 292. This may be accomplished by prompting a user, by performing checks on the application software, or by any other suitable method. If all of the semantics are determined not to have been defined, then the semantics and corresponding attributes are defined at block 294. These definitions may be entered manually by a user of the managing system or may be performed under an automated process. After all the semantics have been defined at block 294 or if all the semantics are determined to have been defined at test 292, then process 280 determines whether all transactions for the application process have been defined at test 296. If all of the transactions are determined not to have been defined at test 296, then groups of semantics are defined into the required transactions at block 298. As with the semantics definitions, the transaction definitions may be performed through user interaction or by an automated process. Once all of the transactions have been defined at block 298 or if all of the transactions are determined to have been defined at test 296, process 280 defines transaction routing between the source application process and the one or more destination application processes. As with the definition performed in blocks 294 and 298, this definition may be generated through user input or an automated process. Finally, at block 302, the semantic, transaction, and routing data are packaged and sent to each affected broker process, and then process 280 is completed at block 304.

Thus it is seen that by performing the conversion and routing functions of the system and method of the present invention, only a single translator is required for each source and destination application process using this system and method, changes, additions, and deletions of sources and destinations of data transmissions can be made without the modification or shutting down of a source or destination application process using this system and method, and that this system and method can be implemented in virtually any enterprise architecture without requiring that each processing system of the architecture be custom built. One skilled the art will appreciate that the present invention can be implemented by other than the described embodiments, which are presented for purposes of illustration and not of limitation, and the present invention is limited only by the claims that follow.

What is claimed is:

1. A method of communicating data from a source process to a destination process, the method comprising:

receiving the data in a source format from the source process;

converting the data from the source format to a standard format;

transmitting the data in the standard format to a destination address that is associated with the destination process;

receiving the data transmitted in the standard format at the destination address;

converting said data from the standard format to a destination format;

transmitting the data in the destination format to the destination process;

generating an acknowledgment of receipt of the data when the data is received at the destination process; and notifying a user of an error upon an occurrence of at least one of a specified number of other transmission attempts and an absence of the acknowledgment of receipt within a given time period.

2. The method of claim 1, wherein the communication data is of a known data type.

3. The method of claim 1, further comprising:

determining the destination address based upon a source address associated with the source process after receiving the data in the source format from the source process.

4. A machine readable medium encoded with machine readable instructions for performing a method of communicating data of a known data type from a source process to a destination process, said method comprising:

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process;

prior to said receiving of said data in said source format, defining at least one of said known data type, said source address, said source format, said standard format, said destination format, and a relationship between said destination address and said at least one of said known data type and said source address, wherein said relationship is defined by accepting user input that defines said relationship between said destination address and said at least one of said known data type and said source address;

said determining using said relationship in determining said destination address; and said relationship relating said destination address to both said known data type and said source address.

5. The machine readable medium of claim 4, said method further comprising:

generating an acknowledgment of receipt of said data when said data transmitted in said destination format is received at said destination process; and notifying a user of an error upon an occurrence of at least one of a specified number of other transmission attempts and an absence of said acknowledgment of receipt within a given time period.

6. The machine readable medium of claim 4, wherein each of said source format, said standard format, and said destination format are different.

7. The machine readable medium of claim 4, wherein:

said source format and said destination format are identical; and said source format and said destination format are different from said standard format.

8. The machine readable medium of claim 4, wherein said defining comprises accepting user input that defines said source address of said source process.

9. The machine readable medium of claim 4, wherein said defining comprises accepting user input that defines said source format of said data.

10. The machine readable medium of claim 4, wherein said defining comprises accepting user input that defines said destination format of said data.

11. The machine readable medium of claim 4, wherein said converting of said data from said standard format to said destination format comprises selecting said destination format from a plurality of available destination formats based upon said known data type of said data.

12. The machine readable medium of claim 4, wherein said converting of said data from said standard format to said destination format comprises selecting said destination format from a plurality of available destination formats based upon said destination address transmitted with said data in said standard format.

13. A machine readable medium encoded with machine readable instructions for performing a method of communicating data of a known data type from a source process to a destination process, said method comprising:

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process;

prior to said receiving of said data in said source format, defining at least one of said known data type, said source address, said source format, said standard format, said destination format, and a relationship between said destination address and said at least one of said known data type and said source address, wherein said relationship is defined by accepting user input that defines said relationship between said destination address and said at least one of said known data type and said source address;

said determining using said relationship in determining said destination address; and said relationship relating said destination address to said source address without relating said destination address to said known data type.

14. A machine readable medium encoded with machine readable instructions for performing a method of communicating data of a known data type from a source process to a destination process, said method comprising:

receiving said data in a source format from said source process;

converting said data from said source format to a standard format;
determining a destination address that is associated with said destination process based upon at least one of said known data type and a source address that is associated with said source process;
transmitting said data in said standard format with said destination address;
receiving said data transmitted in said standard format at said destination address;
converting said data in said standard format to a destination format;
transmitting said data in said destination format to said destination process;
prior to said receiving of said data in said source format, defining at least one of said known data type, said source address, said source format, said standard format, said destination format, and a relationship between said destination address and said at least one of said known data type and said source address, wherein said relationship is defined by accepting user input that defines said relationship between said destination address and said at least one of said known data type and said source address;
said determining using said relationship in determining said destination address; and
said relationship relating said destination address to said known data type without relating said destination address to said source address.

15. A system for communicating data of a known data type from a source process to a destination process, the system comprising:
means for receiving said data in a source format from said source process;
means for converting said data from said source format to a standard format;
means for determining a destination address that is associated with said destination process based upon at least one of said known data type and a source address that is associated with said source process;
means for transmitting said data in said standard format with said destination address;
means for receiving said data transmitted in said standard format at said destination address;
means for converting said data in said standard format to a destination format;
means for transmitting said data in said destination format to said destination process;
means for generating an acknowledgment of receipt of said data when said data transmitted by said destination transmitter is received at said destination process; and
means for notifying a user of an error upon an occurrence of at least one of a specified number of other transmission attempts and an absence of said acknowledgment of receipt within a given time period.

16. The system of claim 15, wherein each of said source format, said standard format, and said destination format are different.

17. The system of claim 15, wherein:
said source format and said destination format are identical; and
said source format and said destination format are different from said standard format.

18. The system of claim 15, further comprising means for defining at least one of said known data type, said source address, said standard format, said destination format, and a relationship between said destination address and said at least one of said known data type and said source address prior to said data in said source format being received by said source receiver.

19. The system of claim 18, wherein said means for defining at least one of known data type accepts user input that defines said known data type of said data.

20. The system of claim 18, wherein said means for defining at least one of known data type accepts user input that defines said source address of said source process.

21. The system of claim 18, wherein said means for defining at least one of known data type accepts user input that defines said source format of said data.

22. The system of claim 18, wherein said means for defining at least one of known data type accepts user input that defines said standard format of said data.

23. The system of claim 18, wherein said means for defining at least one of known data type accepts user input that defines said destination format of said data.

24. The system of claim 18, wherein said wherein said means for defining at least one of known data type accepts user input that defines said relationship between said destination address and said at least one of said known data type and said source address.

25. The system of claim 18, wherein:
said addressing mechanism uses said relationship in determining said destination address; and
said relationship relates said destination address to both said known data type and said source address.

26. The system of claim 18, wherein:
said means for determining a destination address uses said relationship in determining said destination address; and
said relationship relates said destination address to said source address without relating said destination address to said known data type.

27. The system of claim 18, wherein:
said means for determining a destination address uses said relationship in determining said destination address; and
said relationship relates said destination address to said known data type without relating said destination address to said source address.

28. The system of claim 15, wherein said means for converting said data comprises means for selecting said destination format from a plurality of available destination formats based upon said known data type of said data.

29. The system of claim 15, wherein said means for converting said data comprises means for selecting said destination format from a plurality of available destination formats based upon said destination address transmitted with said data in said standard format.

30. A machine readable medium encoded with machine readable instructions for performing a method of communicating data of a known data type from a source process to a destination process, said method comprising:
receiving said data in a source format from said source process;
converting said data from said source format to a standard format;
determining a destination address that is associated with said destination process based upon at least one of said known data type and a source address that is associated with said source process;
transmitting said data in said standard format with said destination address;

receiving said data transmitted in said standard format at said destination address;

converting said data in said standard format to a destination format;

transmitting said data in said destination format to said destination process; and prior to said receiving of said data in said source format, defining at least one of said known data type, said source address, said source format, said standard format, said destination format, and a relationship between said destination address and said at least one of said known data type and said source address, wherein said determining uses said relationship in determining said destination address, and said relationship relates said destination address to both said known data type and said source address.

31. The machine readable medium of claim 30, said method further comprising:

when said data transmitted in said destination format is received at said destination process, generating an acknowledgment of receipt of said data; and notifying a user of an error upon an occurrence of at least one of a specified number of other transmission attempts and an absence of said acknowledgment of receipt within a given time period.

32. The machine readable medium of claim 30, wherein each of said source format, said standard format, and said destination format are different.

33. The machine readable medium of claim 30, wherein:

said source format and said destination format are identical; and said source format and said destination format are different from said standard format.

34. The machine readable medium of claim 30, wherein said defining comprises accepting user input that defines said known data type of said data.

35. The machine readable medium of claim 30, wherein said defining comprises accepting user input that defines said source address of said source process.

36. The machine readable medium of claim 30, wherein said defining comprises accepting user input that defines said source format of said data.

37. The machine readable medium claim 30, wherein said defining comprises accepting user input that defines said standard format of said data.

38. The machine readable medium claim 30, wherein said defining comprises accepting user input that defines said destination format of said data.

39. The machine readable medium of claim 30, wherein said converting of said data from said standard format to said destination format comprises selecting said destination format from a plurality of available destination formats based upon said known data type of said data.

40. The machine readable medium of claim 30, wherein said converting of said data from said standard format to said destination format comprises selecting said destination format from a plurality of available destination formats based upon said destination address transmitted with said data in said standard format.

41. A machine readable medium encoded with machine readable instructions for performing a method of communicating data of a known data type from a source process to a destination process, said method comprising:

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process; and prior to said receiving of said data in said source format, defining at least one of said known data type, said source address, said source format, said standard format, said destination format, and a relationship between said destination address and said at least one of said known data type and said source address, wherein said determining uses said relationship in determining said destination address, and said relationship relates said destination address to said source address without relating said destination address to said known data type.

42. The machine readable medium of claim 41, said method further comprising:

generating an acknowledgment of receipt of said data when said data transmitted in said destination format is received at said destination process; and notifying a user of an error upon an occurrence of at least one of a specified number of other transmission attempts and an absence of said acknowledgment of receipt within a given time period.

43. The machine readable medium of claim 41, wherein each of said source format, said standard format, and said destination format are different.

44. The machine readable medium of claim 41, wherein:

said source format and said destination format are identical; and said source format and said destination format are different from said standard format.

45. The machine readable medium of claim 41, wherein said defining comprises accepting user input that defines said known data type of said data.

46. The machine readable medium of claim 41, wherein said defining comprises accepting user input that defines said source address of said source process.

47. The machine readable medium of claim 41, wherein said defining comprises accepting user input that defines said source format of said data.

48. The machine readable medium of claim 41, wherein said defining comprises accepting user input that defines said standard format of said data.

49. The machine readable medium of claim 41, wherein said defining comprises accepting user input that defines said destination format of said data.

50. The machine readable medium of claim 41, wherein said converting of said data from said standard format to said destination format comprises selecting said destination format from a plurality of available destination formats based upon said known data type of said data.

51. The machine readable medium of claim 41, wherein said converting of said data from said standard format to said destination format comprises selecting said destination format from a plurality of available destination formats based upon said destination address transmitted with said data in said standard format.

52. A machine readable medium encoded with machine readable instructions for performing a method of communicating data of a known data type from a source process to a destination process, said method comprising:

receiving said data in a source format from said source process;

converting said data from said source format to a standard format;

determining a destination address that is associated with said destination process based upon at least one of said known data type and a source address that is associated with said source process;

transmitting said data in said standard format with said destination address;

receiving said data transmitted in said standard format at said destination address;

converting said data in said standard format to a destination format;

transmitting said data in said destination format to said destination process; and prior to said receiving of said data in said source format, defining at least one of said known data type, said source address, said source format, said standard format, said destination format, and a relationship between said destination address and said at least one of said known data type and said source address, wherein said determining uses said relationship in determining said destination address, and said relationship relates said destination address to said known data type without relating said destination address to said source address.

53. The machine readable medium of claim 52, said method further comprising:

when said data transmitted in said destination format is received at said destination process, generating an acknowledgment of receipt of said data; and notifying a user of an error upon an occurrence of at least one of a specified number of other transmission attempts and an absence of said acknowledgment of receipt within a given time period.

54. The machine readable medium of claim 52, wherein each of said source format, said standard format, and said destination format are different.

55. The machine readable medium of claim 52, wherein:

said source format and said destination format are identical; and said source format and said destination format are different from said standard format.

56. The machine readable medium of claim 52, wherein said defining comprises accepting user input that defines said known data type of said data.

57. The machine readable medium of claim 52, wherein said defining comprises accepting user input that defines said source address of said source process.

58. The machine readable medium of claim 52, wherein said defining comprises accepting user input that defines said source format of said data.

59. The machine readable medium of claim 52, wherein said defining comprises accepting user input that defines said standard format of said data.

60. The machine readable medium of claim 52, wherein said defining comprises accepting user input that defines said destination format of said data.

61. The machine readable medium of claim 52, wherein said converting of said data from said standard format to said destination format comprises selecting said destination format from a plurality of available destination formats based upon said known data type of said data.

62. The machine readable medium of claim 52, wherein said converting of said data from said standard format to said destination format comprises selecting said destination format from a plurality of available destination formats based upon said destination address transmitted with said data in said standard format.

63. A system for communicating data of a known data type from a source process to a destination process, the system comprising:

means for receiving said data in a source format from said source process;

means for converting said data from said source format to a standard format;

means for determining a destination address that is associated with said destination process based upon at least one of said known data type and a source address that is associated with said source process;

means for transmitting said data in said standard format with said destination address;

means for receiving said data transmitted in said standard format at said destination address;

means for converting said data in said standard format to a destination format;

means for transmitting said data in said destination format to said destination process; and means for defining at least one of said known data type, said source address, said standard format, said destination format, and a relationship between said destination address and said at least one of said known data type and said source address prior to said data in said source format being received by said source receiver.

64. The system of claim 63, further comprising:

means for generating an acknowledgment of receipt of said data when said data transmitted by said destination transmitter is received at said destination process; and means for notifying a user of an error upon an occurrence of at least one of a specified number of other transmission attempts and an absence of said acknowledgment of receipt within a given time period.

65. The system of claim 63, wherein each of said source format, said standard format, and said destination format are different.

66. The system of claim 63, wherein:

said source format and said destination format are identical; and said source format and said destination format are different from said standard format.

67. The system of claim 63, wherein said means for defining data accepts user input that defines said known data type of said data.

68. The system of claim 63, wherein said means for defining data accepts user input that defines said source address of said source process.

69. The system of claim 63, wherein said means for defining data accepts user input that defines said source format of said data.

70. The system of claim 63, wherein said means for defining data accepts user input that defines said standard format of said data.

71. The system of claim 63, wherein said means for defining data accepts user input that defines said destination format of said data.

72. The system of claim 63, wherein said means for defining data accepts user input that defines said relationship between said destination address and said at least one of said known data type and said source address.

73. The system of claim 63, wherein:
said means for determining said destination address uses said relationship in determining said destination address; and
said relationship relates said destination address to both said known data type and said source address.

74. The system of claim 63, wherein:
said means for determining said destination address uses said relationship in determining said destination address; and
said relationship relates said destination address to said source address without relating said destination address to said known data type.

75. The system of claim 63, wherein:
said means for determining said destination address uses said relationship in determining said destination address; and
said relationship relates said destination address to said known data type without relating said destination address to said source address.

76. The system of claim 63, wherein said means for converting comprises a selecting mechanism that selects said destination format from a plurality of available destination formats based upon said known data type of said data.

77. The system of claim 63, wherein said means for converting comprises a selecting mechanism that selects said destination format from a plurality of available destination formats based upon said destination address transmitted with said data in said standard format.

78. A machine readable medium encoded with machine readable instructions for performing a method of communicating data of a known data type from a source process to a destination process, said method comprising:
receiving the data in a source format from the source process;
converting the data from the source format to a standard format;
transmitting the data in the standard format to a destination address that is associated with the destination process;
receiving the data transmitted in the standard format at the destination address;
converting said data from the standard format to a destination format;
transmitting the data in the destination format to the destination process;
generating an acknowledgment of receipt of the data when the data is received at the destination process;
notifying a user of an error upon an occurrence of at least one of a specified number of other transmission attempts and an absence of the acknowledgment of receipt within a given time period;
identifying the data type of the transmitted data after receiving the data in the source format from the source process; and
determining the destination address based upon the identified data type of the transmitted data,
wherein the communicated data is of a known data type.

79. A machine readable medium encoded with machine readable instructions for performing a method of communicating data of a known data type from a source process to a destination process, said method comprising:
receiving the data in a source format from the source process;
converting the data from the source format to a standard format;
transmitting the data in the standard format to a destination address that is associated with the destination process;
receiving the data transmitted in the standard format at the destination address;
converting said data from the standard format to a destination format;
transmitting the data in the destination format to the destination process;
generating an acknowledgment of receipt of the data when the data is received at the destination process;
notifying a user of an error upon an occurrence of at least one of a specified number of other transmission attempts and an absence of the acknowledgment of receipt within a given time period;
identifying the data type of the transmitted data after receiving the data in the source format from the source process; and
determining the destination address based upon the identified data type of the transmitted data and a source address associated with the source process,
wherein the communicated data is of a known data type.

80. A machine readable medium encoded with machine readable instructions for performing a method of communicating data of a known data type from a source process to a destination process, said method comprising:
accepting user input that defines a relationship between a destination address that is associated with the destination process and at least one of the known data type and a source address that is associated with the source process;
receiving the data in a source format from the source process;
converting the data from the source format to a standard format;
determining the destination address based upon the defined relationship after receiving the data in the source format from the source process;
transmitting the data in the standard format to the destination address;
receiving the data transmitted in the standard format at the destination address;
converting the data in the standard format to a destination format; and transmitting the data in the destination format to the destination process.

81. The machine readable medium of claim 80, said method further comprising:
defining the known data type, the source address, the source format, the standard format, and the destination format, prior to receiving the data in the source format.

82. The machine readable medium of claim 81, wherein the step of defining comprises accepting user input that defines the known data type, the source address, the source format, the standard format, and the destination format.

83. The machine readable medium of claim 80, wherein the step of converting the data from the standard format to the destination format comprises selecting the destination format from a plurality of available destination formats based solely upon the known data type.

84. The machine readable medium of claim 80, wherein:
the data is transmitted in the standard format with the destination address; and
the step of converting the data from the standard format to the destination format includes selecting the destination format from a plurality of available destination formats based upon the destination address transmitted with the data in the standard format.

85. A machine readable medium encoded with machine readable instructions for performing a method of communicating data from a source process to a destination, said method comprising:
receiving the data in a source format from the source process;
converting the data from the source format to a standard format;
transmitting the data in the standard format to a destination address that is associated with the destination process;
receiving the data transmitted in the standard format at the destination address;
converting said data from the standard format to a destination format;
transmitting the data in the destination format to the destination process;
generating an acknowledgment of receipt of the data when the data is received at the destination process; and
notifying a user of an error upon an occurrence of at least one of a specified number of other transmission attempts and an absence of the acknowledgment of receipt within a given time period.

86. The machine readable medium of claim 85, wherein the communication data is of a known data type.

87. The machine readable medium of claim 85, said method further comprising:
determining the destination address based upon a source address associated with the source process after receiving the data in the source format from the source process.

88. A method of communicating data of a known type from a source process to a destination process, the method comprising:
accepting input that defines a relationship between a destination address that is associated with the destination process and at least one of the known data type and a source address that is associated with the source process;
converting the data from the source format to a standard format; and
determining the destination address based upon the defined relationship.

89. The method of claim 88 further comprising:
generating an acknowledgment of receipt of the data when the data is received at the destination process, wherein the destination process is associated with the destination address.

90. The method of claim 88 further comprising:
receiving the data in the source format from the source process; and
prior to receiving the data in the source format, defining the known data type, the source address, the source format, and the standard format.

91. The method of claim 88, further comprising:
converting the data in the standard format to a destination format, wherein the step of converting the data from the standard format to the destination format comprises selecting the destination format from a plurality of available destination formats based solely upon the known data type.

92. The method of claim 88, further comprising:
converting the data in the standard format to a destination format, wherein the data is transmitted in the standard format with the destination address and the step of converting the data from the standard format to the destination format includes selecting the destination format from a plurality of available destination formats based upon the destination address transmitted with the data in the standard format.

93. The method of claim 88, further comprising:
creating a copy of the data in the standard format; and
transmitting the copy to the destination address and at least one different destination address.

94. The method of claim 88, further comprising:
identifying the destination process from a list in a configuration database.

95. The method of claim 88, further comprising:
converting the data in the standard format to a destination format; and
identifying the destination process as receiving data of the known data type from a list in a configuration database.

96. The method of claim 88, further comprising:
converting the data in the standard format to a destination format;
identifying the destination process as receiving data of the known data type from a list in a configuration database;
identifying at least one different destination process as receiving data of the known data type from a list in the configuration database; and
transmitting the standard format to the destination process and the at least one different destination process.

97. The method of claim 88, further comprising:
converting the data in the standard format to a destination format; and
identifying the destination process from a list in a configuration database, wherein the identification is performed by determining which destination processes listed in the database are indicated as receiving data of the source process.

98. The method of claim 88, further comprising:
converting the data in the standard format to a destination format; and
identifying the destination process as receiving data of the source process from a list in a configuration database;
identifying at least one different destination process as receiving data of the source process; and
transmitting the standard format to the destination process and the at least one different destination process.

99. The method of claim 88, further comprising:
creating at least one copy or the data in the standard format;
adding information identifying the destination process to the copy of the data in the standard format; and
transmitting the at least one copies to at least one different destination addresses associated with the destination process.

100. The method of claim 88 further comprising:
determining at least one different destination address by accessing a configuration database to determine if at least one different destination process associated to the at least one different destination address is receiving data of the source process.

101. The method of claim 88 wherein the standard format is a semantic that is a set of information that is associated with the data.

102. The method of claim 88 wherein the standard format is a semantic that is a set of information that is associated with the data and the semantic includes a label and a set of system-specific requirements for the piece of data.

103. A system for communicating data of a known data type from at least one of a plurality of outbound broker processes to at least one of a plurality of inbound broker processes, the system comprising:
 a configuration database that contains a list of the plurality of inbound broker processes, wherein the configuration database is accessible to the plurality of outbound broker processes;
 a source format associated to the at least one of the plurality of outbound broker processes, wherein the at least one of the plurality of outbound broker processes converts the data of the source format into a standard format and the at least one of the plurality of outbound broker processes has at least one source address;
 a destination format associated to the at least one of a plurality of inbound broker processes, wherein the at least one of the plurality of inbound broker processes converts the data of the standard format into a destination format and the at least one of the plurality of inbound broker processes has at least one destination address; and
 a relationship between the at least one destination addresses and the known data type, wherein the at least one destination addresses are determined based upon the defined relationship.

104. The system of claim 103 wherein the destination format is selected from a plurality of available destination formats based solely upon the known data type.

105. The system of claim 103, further comprising a copy of the data in the standard format wherein the copy is transmitted to at least one of the destination addresses.

106. The system of claim 103, wherein the standard format data is transmitted to the at least one destination addresses.

107. The system of claim 103, further comprising:
 at least one copy of the data in the standard format, wherein information related to the inbound broker process is added to the data of the at least one copy.

108. The system of claim 103, further comprising:
 at least one copy of the data in the standard format, wherein information related to the inbound broker process is added to the data of the at least one copy and the at least one copy is transmitted to at least one destination address associated with the inbound broker process.

109. The system of claim 103 wherein the standard format is a semantic that is a set of information that is associated with the data.

110. The system of claim 103 wherein the standard format is a semantic that is a set of information that is associated with the data and the semantic includes a label and a set of system-specific requirements for the piece of data.

111. A system for communicating a first data from a source application process to one or more destination application processes running on at least one processing system in a communications network, the system comprising:
 a source receiver operable to receive said first data in a source format from said source application process;
 a source translator operable to convert said first data from said source format to a standard format;
 an addressing process operable to determine a first destination that is associated with a first destination application based on a predefined routing relationship;
 a first transmitter operable to transmit said first data in said standard format to said determined first destination;
 a first destination receiver operable to receive said first data transmitted in said standard format at said first destination;
 a first destination translator operable to convert said first data from said standard format to a first destination format;
 a first destination transmitter operable to transmit said first data in said first destination format to said first destination application process; and
 a system manager that, prior to said first data in said source format being received by said source receiver, defines a first transaction type corresponding to the content of said first data, and further defines transaction parameters for said first transaction type including said routing relationship specifying a first destination for said first data, by accepting user input entered into a user interface implemented separately from said source and first destination application processes.

112. The system of claim 111, wherein said addressing process is operable to identify said first transaction type corresponding to the content of said first data and to use said routing relationship for said first transaction type in determining said first destination.

113. The system of claim 112, wherein said determined first destination comprises a queue, wherein said queue is accessible by said destination receiver.

114. The system of claim 113, wherein said queue is located on the same processing system as said first transmitter.

115. The system of claim 113, wherein said queue is located on the same processing system as said first destination application.

116. The system of claim 112, wherein said first destination is identified as an IP address.

117. The system of claim 111, wherein said defined transaction parameters for said first transaction type further includes first destination formatting rules that dictate how said first data is converted between said standard format and said first destination format, said defined transaction parameters for said first transaction type further include source formatting rules that dictate how said first data is converted between said source format and said standard format, and said source translator is operable to use said source formatting rules in converting said first data from said source format to said standard format.

118. The system of claim 111, wherein said defined transaction parameters for said first transaction type further include source formatting rules that dictate how said first data is converted between said source format and said standard format.

119. The system of claim 118, wherein said source translator is operable to use said source formatting rules in converting said first data from said source format to said standard format.

120. The system of claim 119, wherein said source translator comprises a selecting application operable to:

identify said first transaction type corresponding to the content of said first data; and select said source formatting rules from a plurality of available formatting rules based upon said identified first transaction type.

121. The system of claim 111, wherein said defined transaction parameters for said first transaction type further includes first destination formatting rules that dictate how said first data is converted between said standard format and said first destination format.

122. The system of claim 121, wherein said destination translator is operable to use said destination formatting rules in converting said first data from said standard format to said first destination format.

123. The system of claim 122, wherein said destination translator comprises a selecting application operable to:

identify said first transaction type corresponding to the content of said first data; and select said first destination formatting rules from a plurality of available formatting rules based upon said identified first transaction type.

124. The system of claim 111, further comprising an acknowledgment generator operable to generate an acknowledgment of receipt of said first data based upon predefined receipt acknowledgment criteria.

125. The system of claim 124, wherein said defined transaction parameters for said first transaction type further include receipt acknowledgment criteria.

126. The system of claim 125, wherein said acknowledgment generator is operable to use said defined receipt acknowledgment criteria in generating an acknowledgment of receipt of said first data.

127. The system of claim 126, wherein said receipt acknowledgment criteria dictates that said acknowledgment generator generates an acknowledgment of receipt of said first data when said data transmitted by said destination transmitter is received at said first destination process.

128. The system of claim 111, further comprising an error notifier operable to notify a user of an error based upon predefined error notification criteria.

129. The system of claim 128, wherein said defined transaction parameters for said first transaction type further include error notification criteria.

130. The system of claim 129, wherein said error notifier is operable to use said defined error notification criteria in generating a notification of an error in transmitting said first data.

131. The system of claim 130, wherein said error notification criteria dictates that said error notifier generates an error notification upon an occurrence of a specified number of transmission attempts.

132. The system of claim 130, wherein said error notification criteria dictates that said error notifier generates an error notification upon an absence of an acknowledgment of receipt of said first data by said first destination application process within a given time period.

133. The system of claim 130, wherein said error notification criteria dictates that said error notifier generates an error notification if said first data received at said first destination receiver fails one or more integrity checks.

134. The system of claim 111, wherein said defined transaction parameters for said first transaction type further includes security parameters.

135. The system of claim 134, wherein said first transmitter is operable to encrypt said first data prior to transmission based on said defined security parameters.

136. The system of claim 135, wherein said first destination receiver further comprises a data decrypter operable to decrypt said first data received in an encrypted format.

137. The system of claim 111, wherein said first transmitter is operable to assign a serial number incrementally for each data transmission from said source application process to said first destination process for use in identifying a lost or failed data transmission to said first destination process.

138. The system of claim 111, wherein said first transmitter is operable to assemble said first data in said standard format into a transmission record associated with a communications protocol supported by said communications network prior to transmitting said first data to said first destination.

139. The system of claim 111, further comprising:

a second destination application process;

a second destination receiver;

a second destination translator; and a second destination transmitter, wherein said system manager is operable to define a routing relationship that specifies a second destination for said first data.

140. The system of claim 139, wherein said addressing process is operable to determine a second destination that is associated with said second destination application process based on said routing relationship.

141. The system of claim 140, wherein said first transmitter is operable to transmit said first data in said standard format to said second destination.

142. The system of claim 141, wherein said second destination receiver is operable to receive said first data transmitted in said standard format at said second destination.

143. The system of claim 142, wherein said second destination translator is operable to convert said first data from said standard format to a second destination format.

144. The system of claim 143, wherein said second destination transmitter is operable to transmit said first data in said second destination format to said second destination application process.

145. The system of claim 144, wherein said system manager is operable to define second destination formatting rules that dictate how said first data is converted between said standard format and said second destination format.

146. The system of claim 145, wherein said second destination translator is operable to use said second destination formatting rules in converting said first data from said standard format to said second destination format.

147. The system of claim 141, wherein said first transmitter is operable to assign a serial number incrementally for each data transmission from said source application process to said second destination application process for use in identifying a lost or failed data transmission to said second destination application process.

148. The system of claim 141, wherein said first transmitter is operable to assemble said first data in said standard format into a transmission record associated with a communications protocol supported by said communications network prior to transmitting said first data to said second destination.

149. The system of claim 111, wherein said system manager is further operable to, by accepting user input entered into said user interface implemented separately from said source and destination application processes, define:

a second transaction type corresponding to the content of second data received from said source application process;

and second transaction parameters for said second transaction type including a routing relationship specifying a destination for said second data.

150. A system for communicating a first data from a source application process to one or more destination application processes running on at least one processing system in a communications network, the system comprising:
- a source receiver operable to receive said first data in a source format from said source application process;
- a source translator operable to convert said first data from said source format to a standard format;
- an addressing process operable to determine a first destination that is associated with a first destination application based on a predefined routing relationship;
- a first transmitter operable to transmit said first data in said standard format to said determined first destination;
- a first destination receiver operable to receive said first data transmitted in said standard format at said first destination;
- a first destination translator operable to convert said first data from said standard format to a first destination format;
- a first destination transmitter operable to transmit said first data in said first destination format to said first destination application process; and
- a system manager that, prior to said first data in said source format being received by said source receiver, defines a first transaction type associated with said source application process and further defining transaction parameters for said first transaction type, including said routing relationship specifying a first destination for said first data, by accepting user input entered into a user interface implemented separately from said source and first destination application processes.

151. The system of claim 150, wherein said addressing process is operable to identify said first transaction type corresponding to data received from said source application process and to use said routing relationship for said first transaction type in determining said first destination.

152. The system of claim 151, wherein said determined first destination receiver comprises a queue, wherein said queue is accessible by said destination receiver.

153. The system of claim 152, wherein said queue is located on the same processing system as said first transmitter.

154. The system of claim 152, wherein said queue is located on the same processing system as said first destination application.

155. The system of claim 151, wherein said first destination is identified as an IP address.

156. The system of claim 150, wherein said defined transaction parameters for said first transaction type further includes first destination formatting rules that dictate how said first data is converted between said standard format and said first destination format, said defined transaction parameters for said first transaction type further include source formatting rules that dictate how said first data is converted between said source format and said standard format, and said source translator is operable to use said source formatting rules in converting said first data from said source format to said standard format.

157. The system of claim 150, wherein said defined transaction parameters for said first transaction type further include source formatting rules that dictate how said first data is converted between said source format and said standard format.

158. The system of claim 157, wherein said source translator is operable to use said source formatting rules in converting said first data from said source format to said standard format.

159. The system of claim 158, wherein said source translator comprises a selecting application operable to:
- identify said first transaction type corresponding to data received from said source application process; and
- select said source formatting rules from a plurality of available formatting rules based upon said identified first transaction type.

160. The system of claim 150, wherein said defined transaction parameters for said first transaction type further include first destination formatting rules that dictate how said first data is converted between said standard format and said first destination format.

161. The system of claim 160, wherein said destination translator is operable to use said destination formatting rules in converting said first data from said standard format to said first destination format.

162. The system of claim 161, wherein said destination translator comprises a selecting application operable to:
- identify said first transaction type corresponding to data received from said source application process; and
- select said first destination formatting rules from a plurality of available formatting rules based upon said identified first transaction type.

163. The system of claim 150, further comprising an acknowledgment generator operable to generate an acknowledgment of receipt of said first data based upon predefined receipt acknowledgment criteria.

164. The system of claim 163, wherein said defined transaction parameters for said first transaction type further include receipt acknowledgment criteria.

165. The system of claim 164, wherein said acknowledgment generator is operable to use said defined receipt acknowledgment criteria in generating an acknowledgment of receipt of said first data.

166. The system of claim 165, wherein said receipt acknowledgment criteria dictates that said acknowledgment generator generate an acknowledgment of receipt of said first data when said data transmitted by said destination transmitter is received at said first destination process.

167. The system of claim 150, further comprising an error notifier operable to notify a user of an error based upon predefined error notification criteria.

168. The system of claim 167, wherein said defined transaction parameters for said first transaction type further include error notification criteria.

169. The system of claim 168, wherein said error notifier is operable to use said defined error notification criteria in generating a notification of an error in transmitting said first data.

170. The system of claim 169, wherein said error notification criteria dictates that said error notifier generate an error notification upon an occurrence of a specified number of transmission attempts.

171. The system of claim 169, wherein said error notification criteria dictates that said error notifier generate an error notification upon an absence of an acknowledgment of receipt of said first data by said first destination application process within a given time period.

172. The system of claim 169, wherein said error notification criteria dictates that said error notifier generate an error notification if said first data received at said first destination receiver fails one or more integrity checks.

173. The system of claim 150, wherein said defined transaction parameters for said first transaction type further include security parameters.

174. The system of claim 173, wherein said first transmitter is operable to encrypt said first data prior to transmission based on said defined security parameters.

175. The system of claim 174, wherein said first destination receiver further comprises a data decrypter operable to decrypt said first data received in an encrypted format.

176. The system of claim 150, wherein said first transmitter is operable to assign a serial number incrementally for each data transmission from said source application process to said first destination process for use in identifying a lost or failed data transmission to said first destination process.

177. The system of claim 150, wherein said first transmitter is operable to assemble said first data in said standard format into a transmission record associated with a communications protocol supported by said communications network prior to transmitting said first data to said first destination.

178. The system of claim 150, further comprising a second destination application process, a second destination receiver, a second destination translator, and a second destination transmitter, and wherein said system manager is operable to define a routing relationship that specifies a second destination for said first data.

179. The system of claim 178, wherein said addressing process is operable to determine a second destination that is associated with said second destination application process based on said routing relationship.

180. The system of claim 179, wherein said first transmitter is operable to transmit said first data in said standard format to said second destination.

181. The system of claim 180, wherein said second destination receiver is operable to receive said first data transmitted in said standard format at said second destination.

182. The system of claim 181, wherein said second destination translator is operable to convert said first data from said standard format to a second destination format.

183. The system of claim 182, wherein said second destination transmitter is operable to transmit said first data in said second destination format to said second destination application process.

184. The system of claim 183, wherein said system manager is operable to define second destination formatting rules that dictate how said first data is converted between said standard format and said second destination format.

185. The system of claim 184, wherein said second destination translator is operable to use said second destination formatting rules in converting said first data from said standard format to said second destination format.

186. The system of claim 180, wherein said first transmitter is operable to assign a serial number incrementally for each data transmission from said source application process to said second destination process for use in identifying a lost or failed data transmission to said second destination process.

187. The system of claim 180, wherein said first transmitter is operable to assemble said first data in said standard format into a transmission record associated with a communications protocol supported by said communications network prior to transmitting said first data to said second destination.

188. The system of claim 150 further comprising a second source application process and wherein said system manager is further operable to, by accepting user input entered into said user interface implemented separately from said source and destination application processes, define:

a second transaction type corresponding to second data received from said second source application process; and second transaction parameters for said second transaction type including a routing relationship specifying a destination for said second data.

189. A method for communicating a first data from a source application process to one or more destination processes running on at least one processing system in a communications network, the method comprising:

receiving, at a source receiver, said first data in a source format from said source application process;

converting, at a source translator, said first data from said source format to a standard format;

determining, at an addressing process, a first destination that is associated with a first destination application based on a predefined routing relationship;

transmitting, at a first transmitter, said first data in said standard format to said determined first destination;

receiving, at a first destination receiver, said first data transmitted in said standard format at said first destination;

converting, at a first destination translator, said first data from said standard format to a first destination format;

transmitting, at a first destination transmitter, said first data in said first destination format to said first destination application process;

defining, at a system manager, prior to said first data in said source format being received by said source receiver, a first transaction type corresponding to the content of said first data; and defining, at said system manager, transaction parameters for said first transaction type including said routing relationship specifying a first destination for said first data, by accepting user input entered into a user interface implemented separately from said source and first destination application processes.

190. The method of claim 189, further comprising:

identifying, at said addressing process, said first transaction type corresponding to the content of said first data; and using said routing relationship for said first transaction type in determining said first destination.

191. The method of claim 190, wherein said determining said first destination comprises identifying a queue accessible by said destination receiver.

192. The method of claim 191, wherein said queue is located on the same processing system as said first transmitter.

193. The method of claim 191, wherein said queue is located on the same processing system as said first destination application.

194. The method of claim 190, further comprising identifying said first destination as an IP address.

195. The method of claim 189, wherein said defined transaction parameters for said first transaction type further includes first destination formatting rules that dictate how said first data is converted between said standard format and said first destination format, said defined transaction parameters for said first transaction type further include source formatting rules that dictate how said first data is converted between said source format and said standard format, and said source translator is operable to use said source formatting rules in converting said first data from said source format to said standard format.

196. The method of claim 189, wherein said defined transaction parameters for said first transaction type further include source formatting rules that dictate how said first data is converted between said source format and said standard format.

197. The method of claim 196, further comprising using, at said source translator, said source formatting rules to convert said first data from said source format to said standard format.

198. The method of claim 197, further comprising:
identifying, at a selecting application, said first transaction type corresponding to the content of said first data, wherein said source translator comprises said selecting application; and
selecting, at said selecting application, said source formatting rules from a plurality of available formatting rules based upon said identified first transaction type.

199. The method of claim 189, further comprising including, for said defined transaction parameters for said first transaction type, first destination formatting rules that dictate how said first data is converted between said standard format and said first destination format.

200. The method of claim 199, further comprising using, at said destination translator, said destination formatting rules in converting said first data from said standard format to said first destination format.

201. The method of claim 200, further comprising:
identifying, at a selecting application, said first transaction type corresponding to the content of said first data, wherein said destination translator comprises said selecting application; and
selecting, at said selecting application, said first destination formatting rules from a plurality of available formatting rules based upon said identified first transaction type.

202. The method of claim 189, further comprising generating, at an acknowledgment generator, an acknowledgment of receipt of said first data based upon predefined receipt acknowledgment criteria.

203. The method of claim 202, further comprising including, for said defined transaction parameters for said first transaction type, receipt acknowledgment criteria.

204. The method of claim 203, further comprising using, at said acknowledgment generator, said defined receipt acknowledgment criteria in generating an acknowledgment of receipt of said first data.

205. The method of claim 204, wherein said receipt acknowledgment criteria dictates that said acknowledgment generator generate an acknowledgment of receipt of said first data when said data transmitted by said destination transmitter is received at said first destination process.

206. The method of claim 189, further comprising notifying, through an error notifier, a user of an error based upon predefined error notification criteria.

207. The method of claim 206, further comprising including, for said defined transaction parameters for said first transaction type, error notification criteria.

208. The method of claim 207, further comprising using, at said error notifier, said defined error notification criteria in generating a notification of an error in transmitting said first data.

209. The method of claim 208, wherein said error notification criteria dictates that said error notifier generate an error notification upon an occurrence of a specified number of transmission attempts.

210. The method of claim 208, wherein said error notification criteria dictates that said error notifier generate an error notification upon an absence of an acknowledgment of receipt of said first data by said first destination application process within a given time period.

211. The method of claim 208, wherein said error notification criteria dictates that said error notifier generate an error notification if said first data received at said first destination receiver fails one or more integrity checks.

212. The method of claim 189, further comprising including, for said defined transaction parameters for said first transaction type, security parameters.

213. The method of claim 212, further comprising encrypting, at said data transmitter, said first data prior to transmission based on said defined security parameters.

214. The method of claim 212, further comprising decrypting, at a data decrypter, said first data received in an encrypted format, wherein said first destination receiver comprises said data decrypter.

215. The method of claim 189, further comprising assigning, at said first transmitter, a serial number incrementally for each data transmission from said source application process to said first destination process for use in identifying a lost or failed data transmission to said first destination process.

216. The method of claim 189, further comprising assembling, at said first transmitter, said first data in said standard format into a transmission record associated with a communications protocol supported by said communications network prior to said transmitting said first data to said first destination.

217. The method of claim 189, further comprising:
providing a second destination application process;
providing a second destination receiver;
providing a second destination translator; and
providing a second destination transmitter, wherein said system manager defines a routing relationship that specifies a second destination for said first data.

218. The method of claim 217, further comprising determining, at said addressing process, a second destination that is associated with said second destination application process based on said routing relationship.

219. The method of claim 218, further comprising transmitting, at said first transmitter, said first data in said standard format to said second destination.

220. The method of claim 219, further comprising receiving, at said second destination receiver, said first data transmitted in said standard format at said second destination.

221. The method of claim 220, further comprising converting, at said second destination translator, said first data from said standard format to a second destination format.

222. The method of claim 221, further comprising transmitting, at said second destination transmitter, said first data in said second destination format to said second destination application process.

223. The method of claim 222, further comprising defining, at said system manager, second destination formatting rules that dictate how said first data is converted between said standard format and said second destination format.

224. The method of claim 223, further comprising using, at said second destination translator, said second destination formatting rules in converting said first data from said standard format to said second destination format.

225. The method of claim 219, further comprising assigning, at said first transmitter, a serial number incrementally for each data transmission from said source application process to said second destination process for use in identifying a lost or failed data transmission to said second destination process.

226. The method of claim 219, further comprising assembling, at said first transmitter, said first data in said standard format into a transmission record associated with a communications protocol supported by said communications network prior to transmitting said first data to said second destination.

227. The method of claim 189, further comprising defining, at said system manager, a second transaction type corresponding to the content of second data received from said source application process, and second transaction parameters for said second transaction type including a routing relationship specifying a destination for said second data, by accepting user input entered into said user interface implemented separately from said source and destination application processes.

228. A method for communicating first data from a source application process to one or more destination processes running on at least one processing method in a communications network, the method comprising:

receiving, at a source receiver, said first data in a source format from a source application process;

converting, at a source translator, said first data from said source format to a standard format;

determining, at an addressing process, a first destination that is associated with a first destination application based on a predefined routing relationship;

transmitting, at a first transmitter, said first data in said standard format to said determined first destination;

receiving, at a first destination receiver, said first data transmitted in said standard format at said first destination;

converting, at a first destination translator, said first data from said standard format to a first destination format;

transmitting, at a first destination transmitter, said first data in said first destination format to said first destination application process;

defining, at a system manager, prior to said first data in said source format being received by said source receiver, a first transaction type corresponding to data received from said source application process; and defining, at said system manager, transaction parameters for said first transaction type, including said routing relationship specifying a first destination for said first data, by accepting user input entered into a user interface implemented separately from said source and first destination application processes.

229. The method of claim 228, further comprising:

identifying, at said addressing process, said first transaction type corresponding to data received from said source application process; and using said routing relationship for said first transaction type in determining said first destination.

230. The method of claim 229, wherein said determined first destination comprises a queue accessible by said destination receiver.

231. The method of claim 230, wherein said queue is located on the same processing method as said first transmitter.

232. The method of claim 230, wherein said queue is located on the same processing method as said first destination application.

233. The method of claim 229, further comprising identifying said first destination as an IP address.

234. The method of claim 228, wherein said defined transaction parameters for said first transaction type further includes first destination formatting rules that dictate how said first data is converted between said standard format and said first destination format, said defined transaction parameters for said first transaction type further include source formatting rules that dictate how said first data is converted between said source format and said standard format, and said source translator is operable to use said source formatting rules in converting said first data from said source format to said standard format.

235. The method of claim 228, wherein said defined transaction parameters for said first transaction type further include source formatting rules that dictate how said first data is converted between said source format and said standard format.

236. The method of claim 235, further comprising using, at said source translator, said source formatting rules in converting said first data from said source format to said standard format.

237. The method of claim 236, further comprising:

identifying, at a selecting application, said first transaction type corresponding to data received from said source application process, wherein said source translator comprises said selecting application; and selecting said source formatting rules from a plurality of available formatting rules based upon said identified first transaction type.

238. The method of claim 228, wherein said defined transaction parameters for said first transaction type further include first destination formatting rules that dictate how said first data is converted between said standard format and said first destination format.

239. The method of claim 238, further comprising using, at said destination translator, said destination formatting rules in converting said first data from said standard format to said first destination format.

240. The method of claim 239, further comprising:

identify, at a selecting application, said first transaction type corresponding to data received from said source application process, wherein said destination translator comprises said selecting application; and selecting said first destination formatting rules from a plurality of available formatting rules based upon said identified first transaction type.

241. The method of claim 228, further comprising generating, at an acknowledgment generator, an acknowledgment of receipt of said first data based upon predefined receipt acknowledgment criteria.

242. The method of claim 241, wherein said defined transaction parameters for said first transaction type further include receipt acknowledgment criteria.

243. The method of claim 242, further comprising using, at said acknowledgment generator, said defined receipt acknowledgment criteria in generating an acknowledgment of receipt of said first data.

244. The method of claim 243, wherein said receipt acknowledgment criteria dictates that said acknowledgment generator generate an acknowledgment of receipt of said first data when said data transmitted by said destination transmitter is received at said first destination process.

245. The method of claim 228, further comprising notifying, through an error notifier, a user of an error based upon predefined error notification criteria.

246. The method of claim 245, wherein said defined transaction parameters for said first transaction type further include error notification criteria.

247. The method of claim 246, further comprising using, at said error notifier, said defined error notification criteria in generating a notification of an error in transmitting said first data.

248. The method of claim 247, wherein said error notification criteria dictates that said error notifier generate an error notification upon an occurrence of a specified number of transmission attempts.

249. The method of claim wherein said error notification criteria dictates that said error notifier generates an error notification upon an absence of an acknowledgment of receipt of said first data by said first destination application process within a given time period.

250. The method of claim 247, wherein said error notification criteria dictates that said error notifier generates an error notification if said first data received at said first destination receiver fails one or more integrity checks.

251. The method of claim 228, wherein said defined transaction parameters for said first transaction type further include security parameters.

252. The method of claim 251, further comprising encrypting, at said data transmitter, said first data prior to transmission based on said defined security parameters.

253. The method of claim 252, further comprising decrypting, at a data decrypter, said first data received in an encrypted format, wherein said first destination receiver further comprises said data decrypter.

254. The method of claim 228, further comprising assigning, at said first transmitter, a serial number incrementally for each data transmission from said source application process to said first destination process for use in identifying a lost or failed data transmission to said first destination process.

255. The method of claim 228, further comprising assembling, at said first transmitter, said first data in said standard format into a transmission record associated with a communications protocol supported by said communications network prior to said transmitting said first data to said first destination.

256. The method of claim 228, further comprising:
providing a second destination application process;
providing a second destination receiver;
providing a second destination translator; and
providing a second destination transmitter, wherein said system manager is operable to define a routing relationship that specifies a second destination for said for said first data.

257. The method of claim 256, further comprising determining, at said addressing process, a second destination that is associated with said second destination application process based on said routing relationship.

258. The method of claim 257, further comprising transmitting, at said first transmitter, said first data in said standard format to said second destination.

259. The method of claim 258, further comprising receiving, at said second destination receiver, said first data transmitted in said standard format at said second destination.

260. The method of claim 259, further comprising converting, at said second destination translator, said first data from said standard format to a second destination format.

261. The method of claim 260, further comprising transmitting, at said second destination transmitter, said first data in said second destination format to said second destination application process.

262. The method of claim 261, further comprising defining, at said system manager, second destination formatting rules that dictate how said first data is converted between said standard format and said second destination format.

263. The method of claim 262, further comprising using, at said second destination translator, use said second destination formatting rules in converting said first data from said standard format to said second destination format.

264. The method of claim 258, further comprising assigning, at said first transmitter, a serial number incrementally for each data transmission from said source application process to said second destination process for use in identifying a lost or failed data transmission to said second destination process.

265. The method of claim 258, further comprising assembling, at said first transmitter, said first data in said standard format into a transmission record associated with a communications protocol supported by said communications network prior to transmitting said first data to said second destination.

266. The method of claim 228, further comprising providing a second source application process, wherein said system manager is further operable to, by accepting user input entered into said user interface implemented separately from said source and destination application processes, define:
a second transaction type corresponding to second data received from said second source application process; and
second transaction parameters for said second transaction type including a routing relationship specifying a destination for said second data.

267. A system for communicating a first data from a source application process to one or more destination processes running on at least one processing system in a communications network, the system comprising:
a source receiver operable to receive said first data in a source format from said source application process;
a source translator operable to convert said first data from said source format to a standard format;
an addressing process operable to determine a first destination that is associated with a first destination application based on a predefined routing relationship;
a first transmitter operable to transmit said first data in said standard format to said determined first destination;
a first destination receiver operable to receive said first data transmitted in said standard format at said first destination;
a first destination translator operable to convert said first data from said standard format to a first destination format;
a first destination transmitter operable to transmit said first data in said first destination format to said first destination application process; and
a system manager that, prior to said first data in said source format being received by said source receiver, defines a first transaction type corresponding to the content of said first data and said source application process, and further defines transaction parameters for said first transaction type including said routing relationship specifying a first destination for said first data, by accepting user input entered into a user interface implemented separately from said source and first destination application processes.

268. A method for communicating a first data from a source application process to one or more destination processes running on at least one processing system in a communications network, the method comprising:

providing a source receiver operable to receive said first data in a source format from said source application process;

providing a source translator operable to convert said first data from said source format to a standard format;

providing addressing process operable to determine a first destination that is associated with a first destination application based on a predefined routing relationship;

providing a first transmitter operable to transmit said first data in said standard format to said determined first destination;

providing a first destination receiver operable to receive said first data transmitted in said standard format at said first destination;

providing a first destination translator operable to convert said first data from said standard format to a first destination format;

providing a first destination transmitter operable to transmit said first data in said first destination format to said first destination application process; and providing a system manager that, prior to said first data in said source format being received by said source receiver, defines a first transaction type corresponding to the content of said first data and to data received from said source application process and further defines transaction parameters for said first transaction type, including said routing relationship specifying a first destination for said first data, by accepting user input entered into a user interface implemented separately from said source and first destination application processes.

269. A management system for setting up a communications network, wherein said management system is operable to:

add a first application process to said communications network;

add a second application process to said communications network;

establish an information broker on one processing system, wherein said information broker is operable to obtain data from said first application process in a first format, said information broker is operable provide said data to said second application process in a second format, and said first and second formats are different;

define a transaction type for said data; and define transaction parameters for said transaction type that determines where said data is provided in said communications network.

270. The management system of claim 269, wherein said transaction parameters determine that said data is provided to at least said second application process.

271. The management system of claim 269, wherein said first format is a semantic format.

272. The management system of claim 269, wherein said second format is a semantic format.

273. The management system of claim 269, wherein said information broker is further operable to determine said first format as being a generic format or a semantic format.

274. The management system of claim 269, further operable to define a group of semantic formats for use in said communications network.

275. The management system of claim 274, further operable to define said group of semantic formats by an automated process.

276. The management system of claim 274, further operable to define said group of semantic formats through the use of user input entered into a user interface.

277. The management system of claim 274, further operable to determine, by an automated process, whether all of said semantic formats of said group have been defined in said communications network.

278. The management system of claim 269, further operable to define said transaction parameters through the use of user input entered into a user interface.

279. The management system of claim 269, further operable to define said transaction parameters by an automated process.

280. The management system of claim 269, further operable to modify said transaction parameters for said data.

281. The management system of claim 269, wherein said information broker is further operable to convert said data obtained in said first format into a standard format.

282. The management system of claim 281, wherein said information broker is further operable to convert said data in said standard format into said second format.

283. The management system of claim 282, further operable to define said standard format.

284. The management system of claim 269, further operable to add said first and second application processes to said communications network through the use of user input entered into a user interface.

285. The management system of claim 269, further operable to add said first and second application processes to said communications network by an automated process.

286. The management system of claim 269, further operable to modify said transaction parameters.

287. The management system of claim 269, further operable to:

add a third application process to said communications network that provides a second data;

define a second transaction type for said second data;

define second transaction parameters for said second transaction type that determines where said data is provided in said communications network.

288. The management system of claim 287, further operable to:

add a fourth application process to said communications system; and establish a second information broker, wherein said second information broker is operable to obtain said second data from said third application process in a third format, said information broker is operable to provide said data to said fourth application process in a fourth format, and said third and fourth formats are different.

289. The management system of claim 287, further operable to:

add a fourth application process to said communications system, wherein said information broker is further operable to obtain said second data from said third application process in a third format, said information broker is further operable to provide said data to said fourth application process in a fourth format, and said third and fourth formats are different.

290. The management system of claim 269, further operable to enable said information broker to perform at least one format conversion function on said data in said first format.

* * * * *